(12) United States Patent
Nini

(10) Patent No.: US 8,464,917 B2
(45) Date of Patent: Jun. 18, 2013

(54) TAP FOR DOSING VISCOUS LIQUIDS

(75) Inventor: Diego Nini, Alessandria (IT)

(73) Assignee: Vitop Moulding S.R.L., Alessandria (IT)

( * ) Notice: Subject to any disclaimer, the term of this patent is extended or adjusted under 35 U.S.C. 154(b) by 345 days.

(21) Appl. No.: 12/934,264

(22) PCT Filed: Mar. 27, 2008

(86) PCT No.: PCT/IT2008/000201
§ 371 (c)(1), (2), (4) Date: Sep. 23, 2010

(87) PCT Pub. No.: WO2009/118766
PCT Pub. Date: Oct. 1, 2009

(65) Prior Publication Data
US 2011/0017782 A1 Jan. 27, 2011

(51) Int. Cl.
*B67D 3/00* (2006.01)
(52) U.S. Cl.
USPC ............... 222/518; 222/481.5; 251/335.2
(58) Field of Classification Search
USPC ............ 222/481.5, 518, 478; 251/144, 335.2
See application file for complete search history.

(56) References Cited

U.S. PATENT DOCUMENTS

| | | | |
|---|---|---|---|
| 3,405,848 A | 10/1968 | Damrel | |
| 6,296,157 B1 * | 10/2001 | Erb | 222/509 |
| 6,470,910 B2 * | 10/2002 | Blackbourn et al. | 137/588 |
| 6,491,189 B2 * | 12/2002 | Friedman | 222/518 |
| 6,742,680 B2 * | 6/2004 | Friedman | 222/509 |
| 6,971,553 B2 * | 12/2005 | Brennan et al. | 222/207 |
| 7,261,224 B2 * | 8/2007 | Cohen et al. | 222/387 |
| 7,434,710 B2 * | 10/2008 | Spriegel | 222/207 |
| 7,455,281 B2 * | 11/2008 | Craft | 251/335.2 |
| 7,513,395 B2 * | 4/2009 | Labinski et al. | 222/481.5 |
| 2005/0263546 A1 | 12/2005 | Labinski et al. | |
| 2007/0181615 A1 * | 8/2007 | Allanson et al. | 222/518 |
| 2008/0116225 A1 * | 5/2008 | Py et al. | 222/207 |
| 2008/0237276 A1 * | 10/2008 | Lester et al. | 222/518 |

FOREIGN PATENT DOCUMENTS

| | | |
|---|---|---|
| GB | 2159496 A | 12/1985 |
| GB | 2175279 A | 11/1986 |
| WO | 2006/005601 A1 | 1/2006 |
| WO | PCT/ISA/210 | 10/2009 |

* cited by examiner

*Primary Examiner* — Kevin P Shaver
*Assistant Examiner* — Christopher Bahr
(74) *Attorney, Agent, or Firm* — Saul Ewing LLP; Peter C. Lauro, Esq.

(57) ABSTRACT

A tap with a dosing chamber for dosing liquids, in particular for dosing high and medium density liquids, including a body equipped with a connecting part to a container of liquid to be delivered through a liquid delivering passage and a valve that opens and closes the liquid delivering passage with an elastic button that actuates the valve and an air circulating tank in order to vent the liquid container when liquid is dispensed.

24 Claims, 34 Drawing Sheets

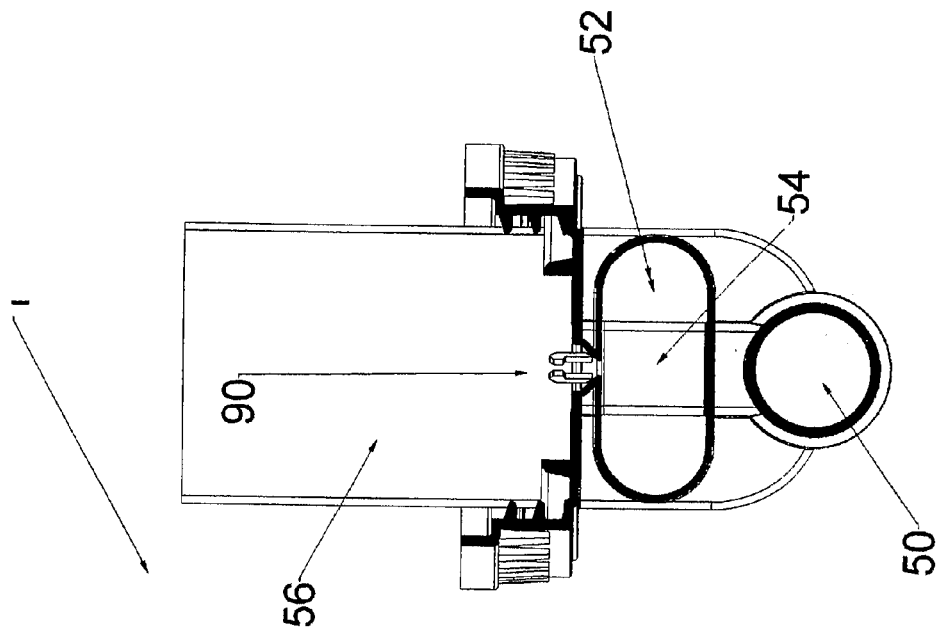
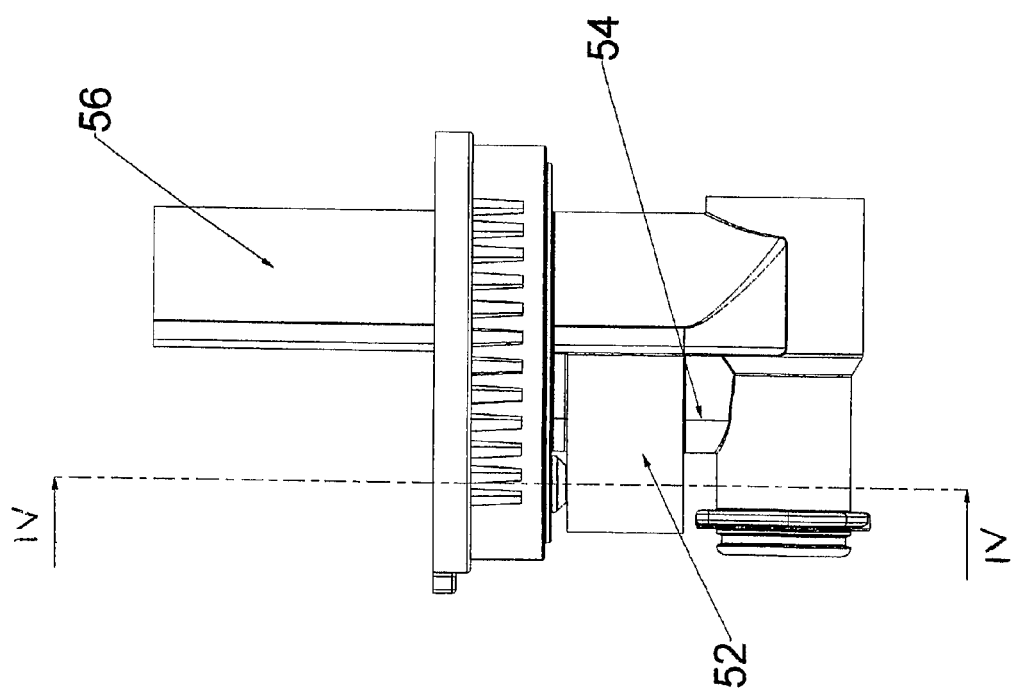
FIG.4

TAP FOR DOSING VISCOUS LIQUIDS

This application is the U.S. national phase, pursuant to 35 U.S.C. §371, of PCT international application Ser. No. PCT/IT2008/000201, filed Mar. 27, 2008, designating the United States and published in English on Oct. 1, 2009 as publication WO 2009/118766 A1. The entire contents of the aforementioned patent applications are incorporated herein by this reference.

The present invention refers to a liquid dosing tap, adapted to deliver pre-arranged and always identical doses of any type of liquids, from suitable containers, both of the rigid type and of the so-called "soft" or "semi-soft" type commercialized under the CHEER PACK™, STAND UP POUCH™, and BAG-IN-BOX™ trademarks.

The most relevant prior art provides for a delivering tap, not suitable for dosing, as disclosed in document WO-A-2007/108025 of the same Applicant of the present invention. The feature that mostly differentiates the inventive tap from the prior tap, in addition to the fact that the previous tap is not used for delivering pre-arranged doses of a product, is that the inventive tap provides for a series of chambers, suitably connected with direct/indirect connections and with the help of a venting channel alternatively driven by the liquid (when the tap is in its opening position and is delivering the pre-arranged dose) and by the air pressure, that is inside the tap chambers, immediately after the liquid dose has been delivered and the system with dosing tap has been closed again, pushed by the liquid that is filling the main accumulation chamber, that allow realising a closed circuit that compels the liquid product to follow a certain path (guided by the various direct and indirect connections of the various chambers) and compels the liquid product to push air, contained in the various chambers, into an intermediate tank, that in turn is connected, by means of a venting channel (driven by an opening and closing valve) to the main container. This guided path and this connection between intermediate tank and venting channel driven by an opening and closing valve allows entering into the main container an air volume equal to the liquid volume that has filled the previous chambers of the dosing tap.

Other examples of taps existing on the market are a tap (disclosed in document GB-A-2333288) that is derived, as regard the pressure-type opening system (the so-called "press tap"), from the first tap introduced on the market (disclosed in document U.S. Pat. No. 4,452,425) to which an integrated air passage has been added.

The problems are several and due to the fact that the air intake is coinciding or adjacent with the liquid outlet. The fact that air intake and liquid outlet are coinciding or adjacent and not well separated makes a "suffocating" effect occur for the air passage: in fact, the fluid, moving along the cylinder surface of body and stem, generates friction that tends to make it slow down. The resistance to fluid movement is however applied only to fluid particles immediately in contact with the surfaces. Therefore, the fluid will tend to adhere to the surfaces themselves, generating the so-called possible air passage "suffocation". Therefore, summarising, at least in its vertical version, the air passage could badly operate; in addition, it is not excluded that such malfunction occurs also in the "horizontal" version, and above all when there are high- and medium-density liquids. This prior art tap, of the "press tap" type, in addition not to have the chance of delivering an accurate dose (or more generally a pre-arranged dose) of liquid, takes air from outside, therefore realising a so-called "open" system, namely as much liquid is removed/delivered from the rigid container, as much air, taken from outside, enters into the rigid container as compensation. Moreover, it is not equipped with any valve-type system on the air inlet driven from pressure/liquid (or only pressure/vacuum) and above all has no internal elements (internal valves) able to separate air chamber from liquid chamber, and now delivering chamber from main tank. Moreover, it must be remembered that the possible air passage (driven or not by an automatic opening and closing valve) in all previously described taps was directly connected to the main tap chamber and its function and operation were different from the venting system that will be described below. In fact, the venting valve of previously mentioned taps opens when a user opens the tap for delivering liquids, in order to provide the chance of immediately compensating, in an open cycle, the delivered amount of liquid with an amount of air (taken from the outside environment) entering the main container, therefore allowing a continuous liquid delivering, while in the inventive tap the valve does not open, driven by the pressurised air, once having closed the tap, in order to let air be vented inside the container in a closed cycle. In previously described taps (only those that are able to deliver liquids), the venting channel (with or without control valve) gets closed when the liquid delivery ends and the valve is controlled by liquid pressure.

Therefore, schematically summarising, on prior art taps, that are not able to deliver pre-arranged doses, for example as disclosed in document WO-A-2007/108025:
- the tap is opened—venting channel opened (from air taken from outside the open cycle);
- the tap is closed—venting channel closed (liquid pressure).

Instead, in the new dose-delivering tap of the present invention:
- the tap is opened—venting channel closed (liquid pressure);
- the tap is closed—venting channel opened (driven by pressurised air).

There is also another type of dosing tap, that has an integrated air passage, and that is used with rigid containers containing high- and medium-density liquids. Such tap is disclosed in document WO-A-2005/124204. This dosing tap generally works well, but has the following defects:
- it has numerous parts (nine or ten), namely cap, body, four or five O-rings, a driving member, a metallic spring and a cover) many of which (such as spring and O-rings) are accessories: therefore, it is a very costly tap, both when assembling, and when moulding it;
- the metallic spring (sometimes when the detergent does not correctly operate as lubricant) is not able to counteract the friction force of internal O-rings of the tap body, and therefore the tap is not perfectly closed, generating liquid leakages;
- O-rings are fragile and therefore gets damaged a short time after their use;
- if FIG. 3 of patent WO-A-2005124204 is taken into account, where the tap opening position is shown, another severe problem can be noted: if, due to any reason, a pressure is applied onto the bottle (but sometimes there are small leakages even if no pressure is applied) that creates a pressure increase (and therefore a pressure difference between bottle exterior and interior), liquid will tend to go out, in addition to the liquid outlet hole, also from the air inlet hole, filling-in the internal chamber created in the driving element (that is also the spring seat). This liquid, once having filed-in the chamber, will overflow outside the tap. Having a pin that is oriented towards the tap interior (when the tap is opened to make the detergent go out), there is the chance of clogging the liquid outlet hole, when the tap is in its opening position, making liquid go out (without applying any pressure on the container)

from the air hole, that in turn, as mentioned above, after having filled-in the driving element chamber, will overflow outside the tap;

accessories like O-rings and metallic springs make the tap difficult to introduce, at the end of its working life, in a recycling cycle for plastic materials, since it would be necessary to first remove everything that is not plastic, for example the spring: unfortunately, in order to remove the spring, it is necessary to disassemble the whole tap, losing time and money and with an impossible operation in a recycling cycle with industrial amounts;

in such taps, it can also happen that, above all when there are medium- and high-density liquids, the liquid dries on the air passage and clogs it. Especially in this type of taps, it can be observed that, when the tap is closed in the hollow space included between the two O-rings having the hole in their centre, so that when the tap is opened it communicates the bottle interior with the outside, there remains some liquid product that can dry and create a solid film that clogs the outside communicating hole (present on the driving element) and in this case the tap does not correctly operate any more and the flow gets blocked.

Other prior taps, as mentioned above, have problems because, not having integrated air passages, need two opposite mouths (on one the tap and on the other one a normal plug will be placed). When using them, the mouth opposite the tap will be opened in order to make air enter the container and to prevent pressure differences between container exterior and interior, that would make the flow from the tap stop. All this system (assembling, moulding and filling) will be very costly and, also in this case, as a maximum a delivering tap can be placed, but never a tap able to deliver an accurate dose.

Another category of delivering taps as regards which the tap of the present invention is an innovation, are the delivering tap for public places, such as bars, used for delivering accurate doses, for example of spirits or liquors.

These delivering devices however exploit an opposite, or anyway different, principle, with respect to the tap of the present invention, namely that of the open system and air for recharging the doses, that is taken from outside. Bar-type dose delivering devices can be used many times (they cost a lot and are composed of many pieces, made both of plastic and of metal) and their assembly is very complex, consequently implying a small production thereof. Moreover, they correctly operate only if the container (commonly a glass bottle) is placed vertically overturned and therefore, in order to do that, they also need a support, which still increases the final application cost.

Bar-type dosing devices (that in English are also called "spirit measures") have a series of problems that are solved by the tap of the present invention:

they are composed of many parts made both of plastic and of metal (internal springs);

they have a high cost and a small productivity;

for their correct operation, especially for bar-type delivering devices, they need to arrange the main container in a vertical position (with a suitable support) with their delivering mouth oriented downwards;

they need accessories in order to arrange the container in a specific position that allows the correct system operation (bottle vertically overturned);

an uncomfortable use for system end consumer/user that must study how the application can work: bar-type devices must be assembled on supports, that in turn must be anchored to a shelf or a table, and then it is necessary to screw or engage the dosing device onto the bottle and, for a correct operation, the dosing device+glass bottle assembly must be assembled on the support whose purpose is keeping the bottle overturned. Without overturning the bottle the system does not operate or badly operates;

many times these dosing devices operate since they compensate the delivered dose of liquid with a dose of air taken from outside (therefore with an open system) and this can rise the problem of liquid leakages outside from the air passage;

since this is an open system, the air passage is always in contact with outside air that can dry (for example if there are substances with sugar) the air passage itself by clogging it and therefore making the system not work any more;

the air inlet valve (outside intake) is mechanically actuated by the same piston that generates the delivering opening.

Object of the present invention is solving the above mentioned problems, by providing a dosing tap for liquids that allows delivering always constant and exact doses of a product and is equipped with an integrated air passage connected with an intermediate tank and a safety valve that is self-guided and self-controlled by the pressure of air pushed by liquid (during the tap closing step and therefore the dose filling step that compels the air in the chamber to move, due to the venting channel, inside the main container) and the liquid force (during the tap opening step in which the valve, pushed by liquid contained in the main container, closes the venting channel preventing liquid from going out during the dose delivering step); such tap is especially suitable for rigid containers, that preferably contain medium- and high-viscosity liquids.

A further object of the present invention is providing a tap as mentioned above that is adapted, with suitable and easy modifications, for all types of containers, such as BAG-IN-BOX™ containers.

Moreover, such tap will provide the chance of changing the volume (and therefore the total amount) of a dose to be delivered by changing sizes or geometry of the main accumulating tank.

The above and other objects and advantages of the invention, as will appear from the following description, are obtained by a liquid dosing tap as claimed in claim 1. Preferred embodiments and non-trivial variations of the present invention are the subject matter of the dependent claims.

The present invention will be better described by some preferred embodiments thereof, provided as a non-limiting example, with reference to the enclosed drawings, in which:

FIG. 4 is a side view of the tap of FIG. 1 with related sectional view performed along line IV-IV;

With reference to the Figures, a preferred embodiment of the liquid dosing tap of the present invention will be shown and described herein below. It will be immediately obvious to the skilled people in the art that numerous variations and modifications (for example related to shape, sizes and parts with equivalent functionality) could be made for the described tap, without departing from the scope of the invention, as defined by the enclosed claims.

With reference to FIGS. 1 to 13, a first preferred embodiment is shown of the dosing tap 1 for liquids of the present invention, in its vertical application.

It will be immediately obvious that the inventive tap 1 could also be used in its horizontal version, with minimum arrangements within reach of a common technician in the art, or in any other orientation required by its final application and also taking into account "pull"-type (vertical or horizontal) opening movements (for example, the pull that is applied on the wings of a standard delivering tap of this type). Moreover, with minimum arrangements within reach of a common technician in the art, this concept could also be applied to a tap with opening by (horizontally or vertically) unscrewing on a cam, such as for example the tap disclosed in document EP-A-1799608.

Figure 33:
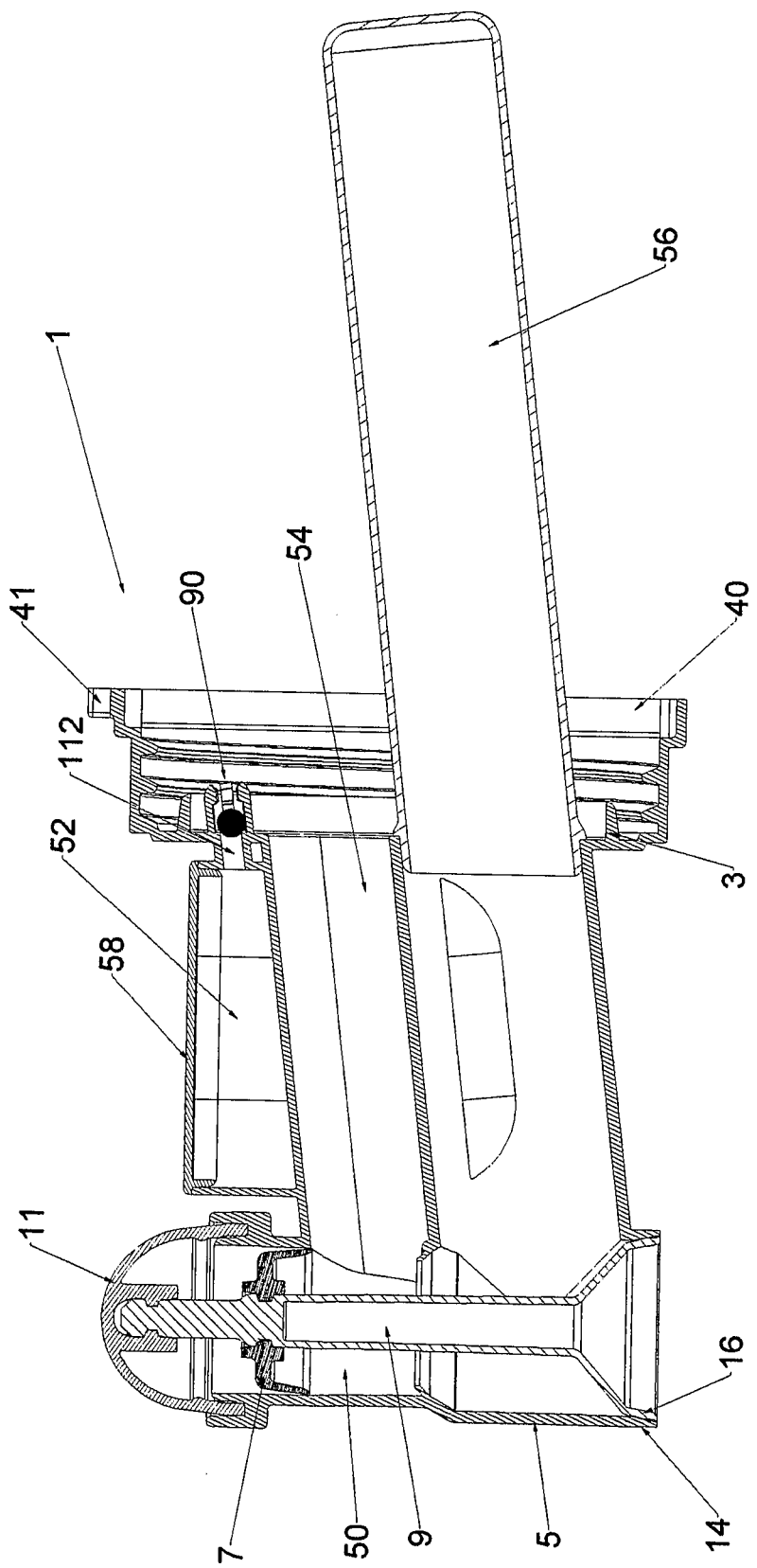
FIG. 33 is a side view of a further embodiment of the inventive tap in its closed position.
Figure 34:
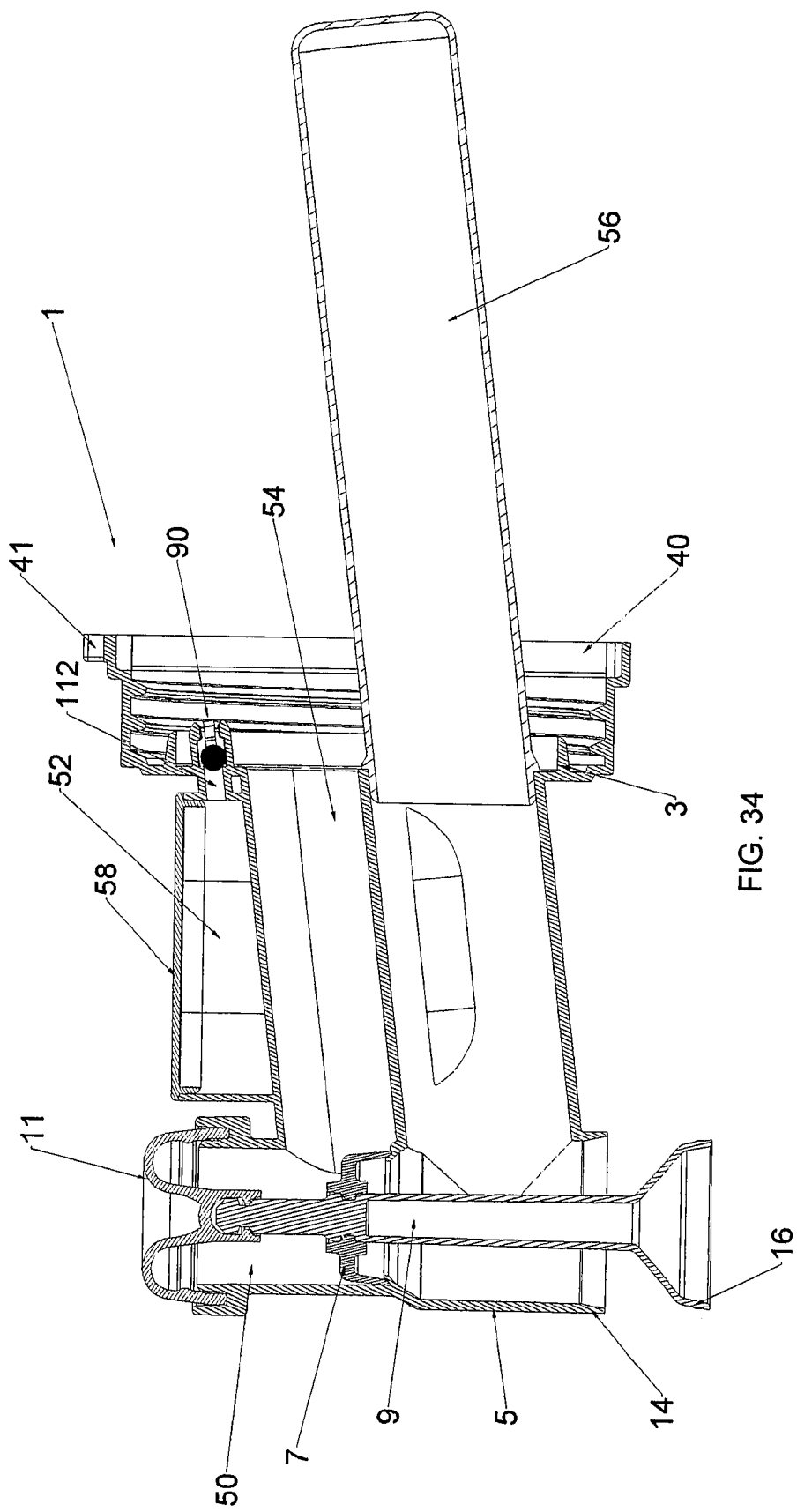
FIG. 34 is a side view of the tap of FIG. 33 in its open position.

FIGS. 14 to 26 then show a second preferred embodiment of the inventive tap 1, while FIGS. 27 to 32 show a third embodiment thereof and FIGS. 33 and 34 show a further preferred embodiment equipped with slanted channels that facilitate the liquid fluid-dynamics. The parts with the same or similar functionality will be designated everywhere by the same reference numbers.

The tap 1 first of all comprises a body 3, having the following main characteristics:

a. it is made of a single piece of plastic material, on which a front cylinder 5 is formed in which a valve 7 slides. Valve 7 is fastened to the handling stem 9, that in turn is fastened to an elastic button 11. In parallel with the above described front cylinder 5, there is the intermediate tank 52 for accumulating and checking the performed charge of the liquid dose and for venting the main accumulating tank 56;

b. the lower part 14 of the body 3 is internally shaped with a profile that is preferably a slanted wall 24 that will allow the lower part of the stem 9 (whose lower part 16 is made with a self-centering beveled geometry) to form the liquid seal.

Always with reference to the body 3 of the inventive tap 1, it is commonly equipped with a threaded area adapted to be coupled with the container (not shown) containing the liquid to be delivered, but it is also possible to create areas with fastening undercut or gluing or welding areas.

The body 3 of the tap 1 therefore has a part 40 that will contact the liquid container, and that must perform a perfect seal with the container itself. On such part 40 at least one reference element 41 is made, that determines the correct position of the tap 1 on the container, cooperating with similar reference elements placed on the container itself.

As regards the valve 7, it will be molded in a semi-rigid, flexible material with elastic memory (for example rubber) that allows simultaneously having the requirements of stiffness and flexibility in some of its spots based on the piece geometry (less stiffness in thin-walled spots, such as the lips, and more stiffness in thicker spots); in the molding step, a sliding agent can be added and can be useful for the piece to have a lower sliding friction in the body cylinder and therefore allowing the sole force of the upper button to be sufficient to perform the automatic closure of the tap once the button is released.

In particular, the lower lip 62 is also flexible for compensating and dampening possible non-axial movements (it operates as guide present on the stem, differently from other taps on the market, whose guides are always on the body): such geometry operates as self-centring element for the stem 9 when the stem 9 slides, namely when opening and closing operations of the tap 1 are performed. The external area of the valve 7 has a self-lubricating hollow space 63 that cooperates with the body 3 in its cylindrical part 5.

The engagement area with the stem 9 has a facilitating bevel 66 for centering on the stem 9, a sealing projection 68 on the stem 9 and a fastening projection 70 that allows fastening the stem 9 to the valve 7.

Finally, a safety trap 72 is provided, that is used for keeping possible material leaks; in any case, there will always be a guarantee that liquid will never go out from inside the tap 1, since also the elastic button 11 (as will be described) seals on the body geometry: this guarantees that, once having assembled the piece and mounted it on the container, everything will be airtight and a closed system is obtained.

The elastic button 11 operates as a return spring. Various geometries are provided in addition to the dome-shaped one shown. In the Figures, it can be noted that such elastic button 11 is equipped with fastening means 74 to the stem 9, at least one fastening projection 76 that is adapted to engage a corresponding recess 78 obtained in the upper part of the stem 9, and sealing means 80, 81 on the body 3 composed of a special geometry adapted to engage a corresponding sealing recess 83 external to the cylindrical part 5 of the body 3. The elastic button 11 abuts onto a corresponding circular projection 82 obtained on the cylindrical part 5 of the body 3. There is also another safer version, since it has both an external and an internal seal, shown in FIG. 32.

Stem 9 can also be made in various geometries and arrangements in order to better suit it to its applications. As shown in the non-limiting embodiments of FIGS. 8, 22, 23, 26, 29 and 30, it is equipped with an elongated body that ends at one end with a holding tooth 84 against the elastic button 11 and at the opposite end with the already shown self-centering beveled part 16, equipped with a smooth outline or a ball-shaped sealing outline. Along the elongated body, there is a sealing seat with valve 7, preferably composed of a tooth 86 and a recess 88, in addition to a liquid sealing area that cooperates with the lower part of the valve 7.

Figure 8:
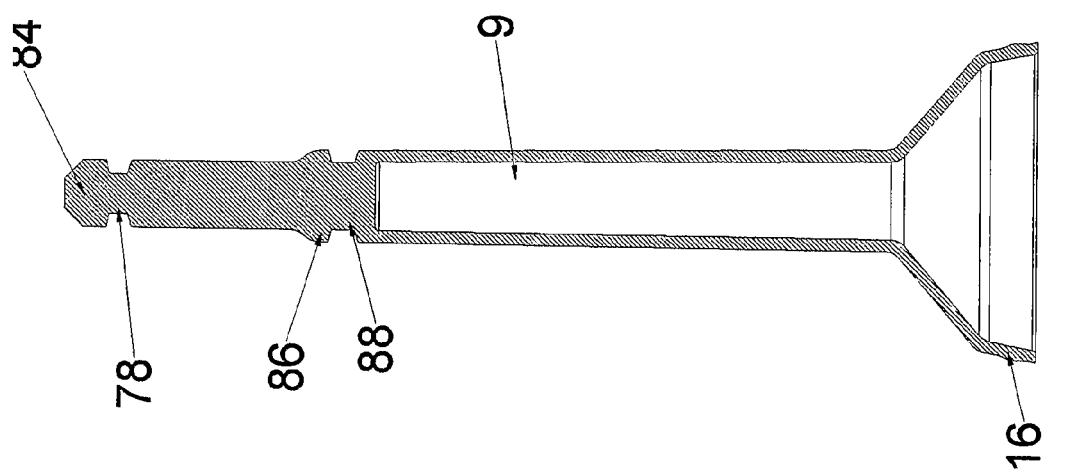
FIG. 8 is a side sectional view of the stem means of the inventive tap.
Figure 9:
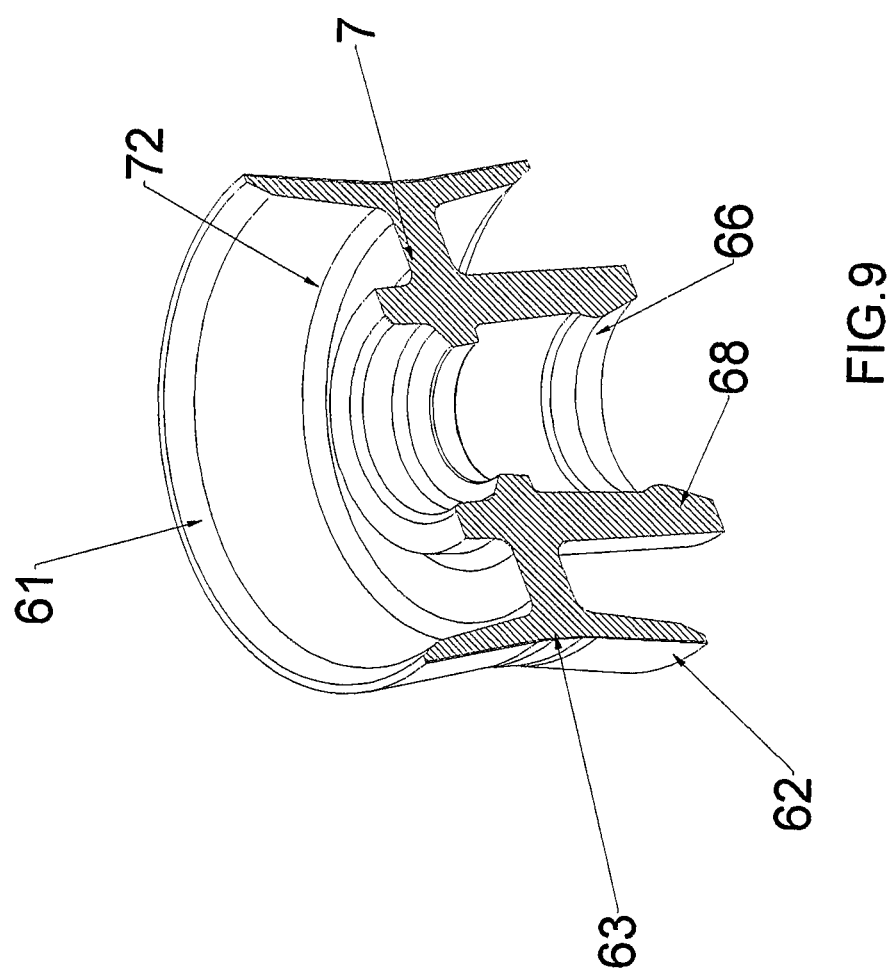
FIG. 9 is a sectional perspective view of the valve means of the inventive tap.
Figure 10:
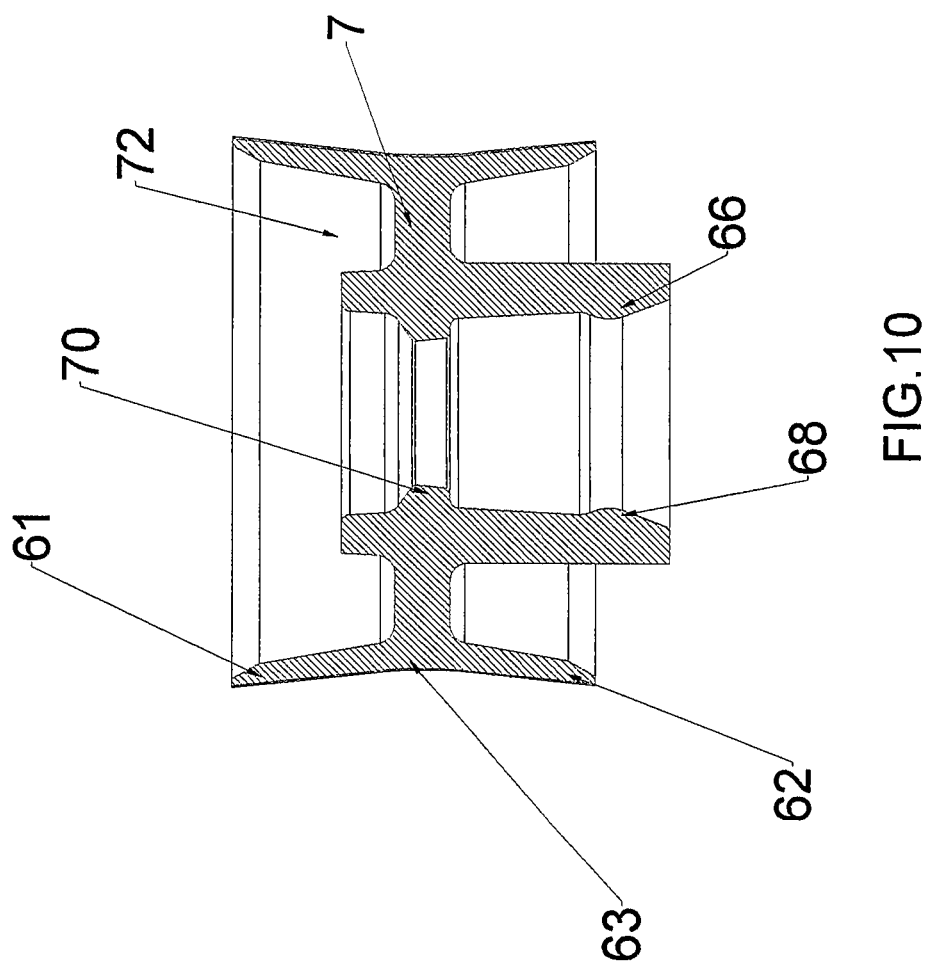
FIG. 10 is a side sectional view of the valve means of FIG. 9.
Figure 11:
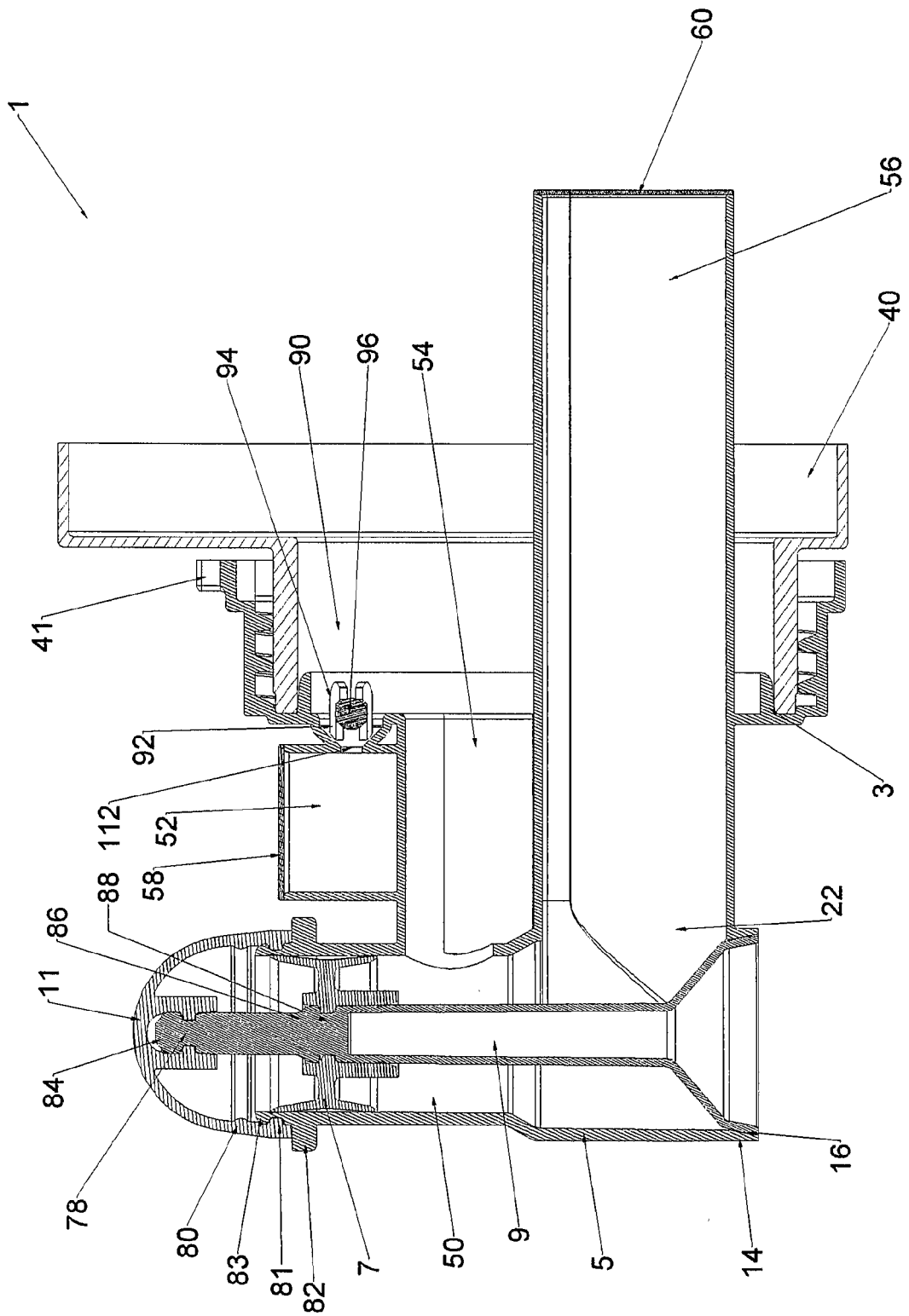
FIG. 11 is a side sectional view of the complete tap of the invention in its closed position.
Figure 22:
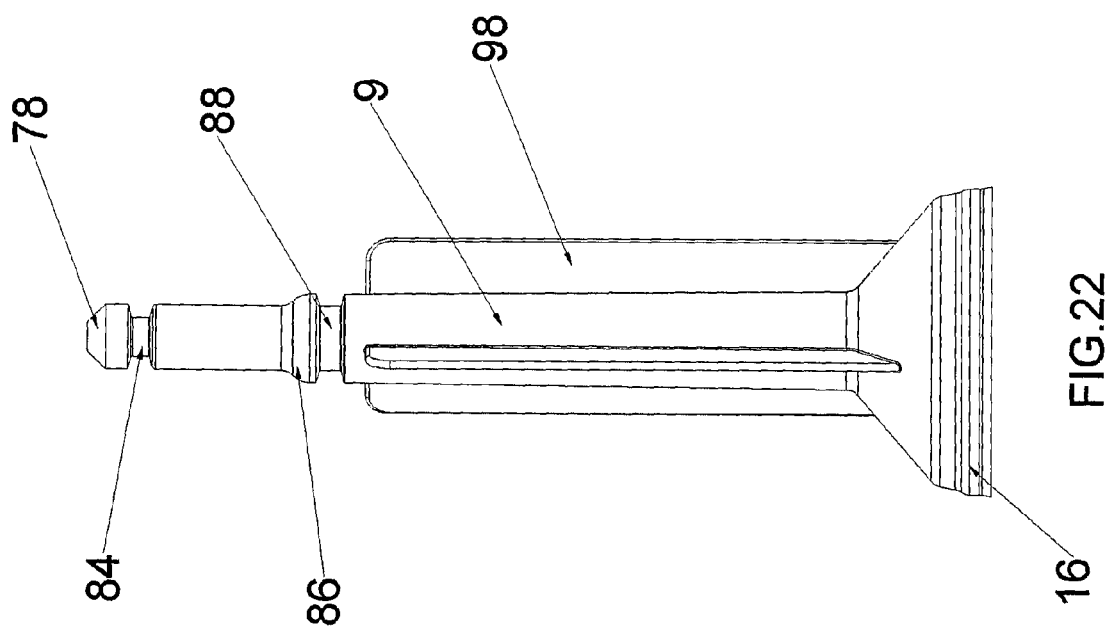
FIG. 22 is a side view of another variation of the stem means of the inventive tap.
Figure 23:
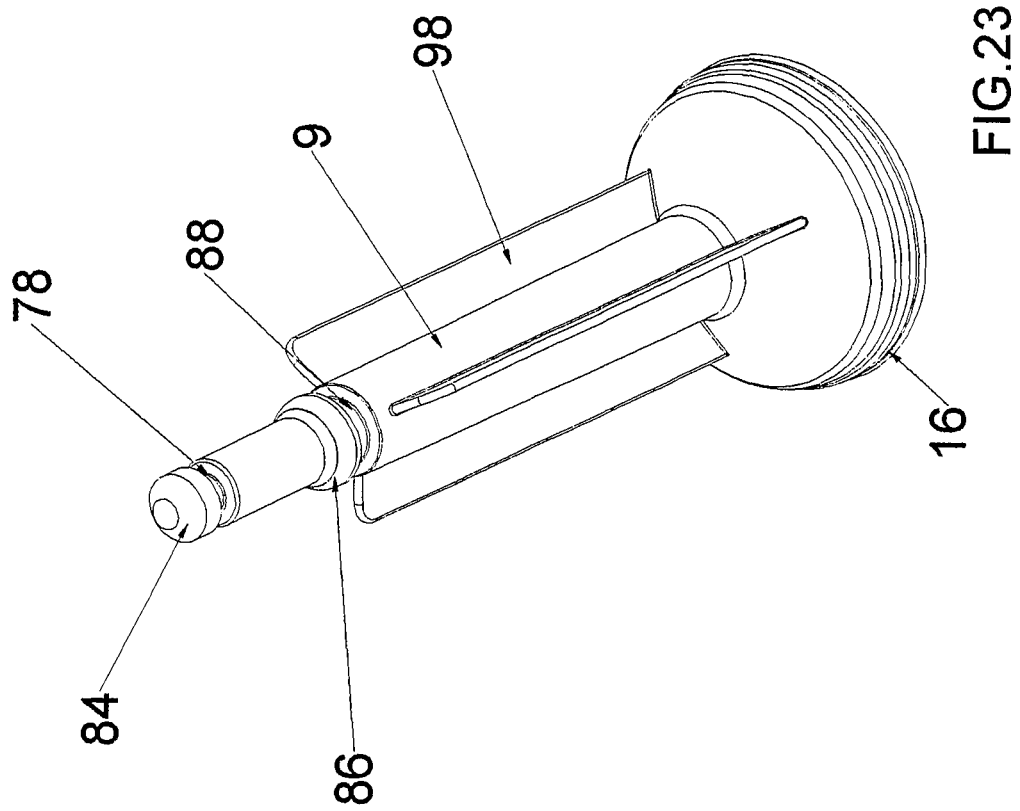
FIG. 23 is a perspective view of the stem means of FIG. 22.
Figure 24:
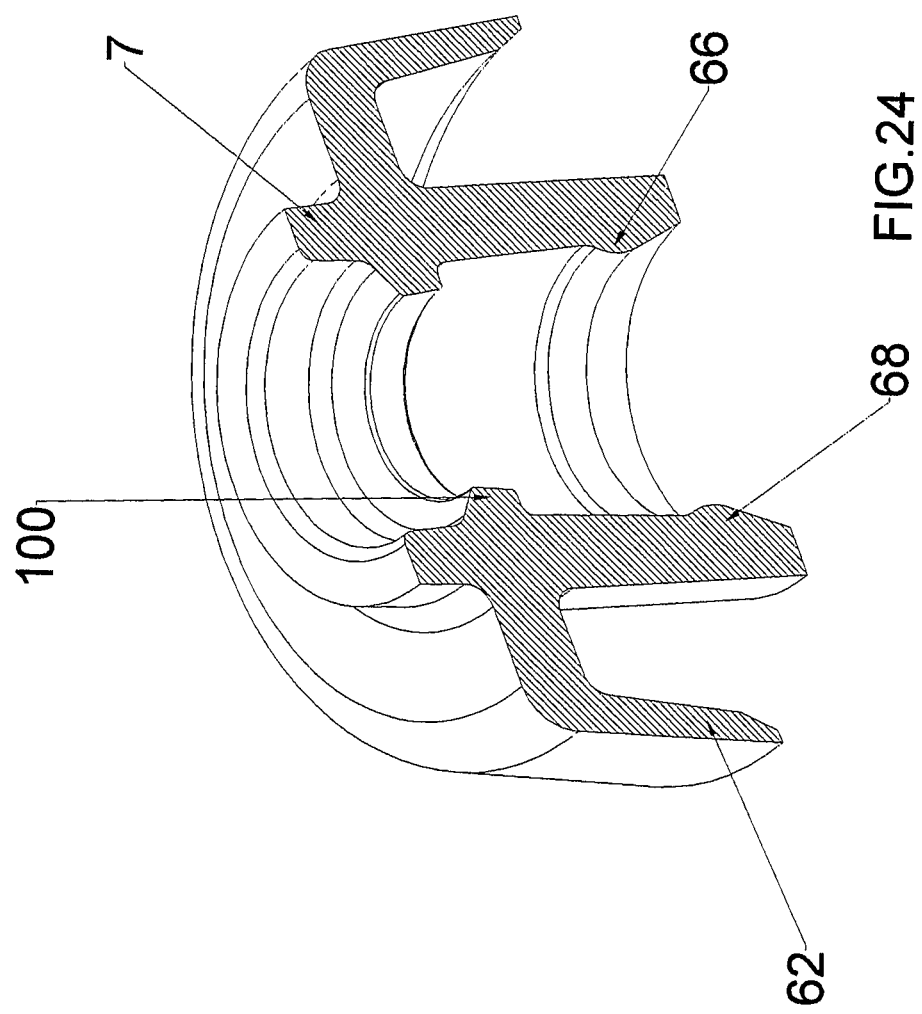
FIG. 24 is a cutaway perspective view of another variation of the valve means of the inventive tap.
Figure 25:
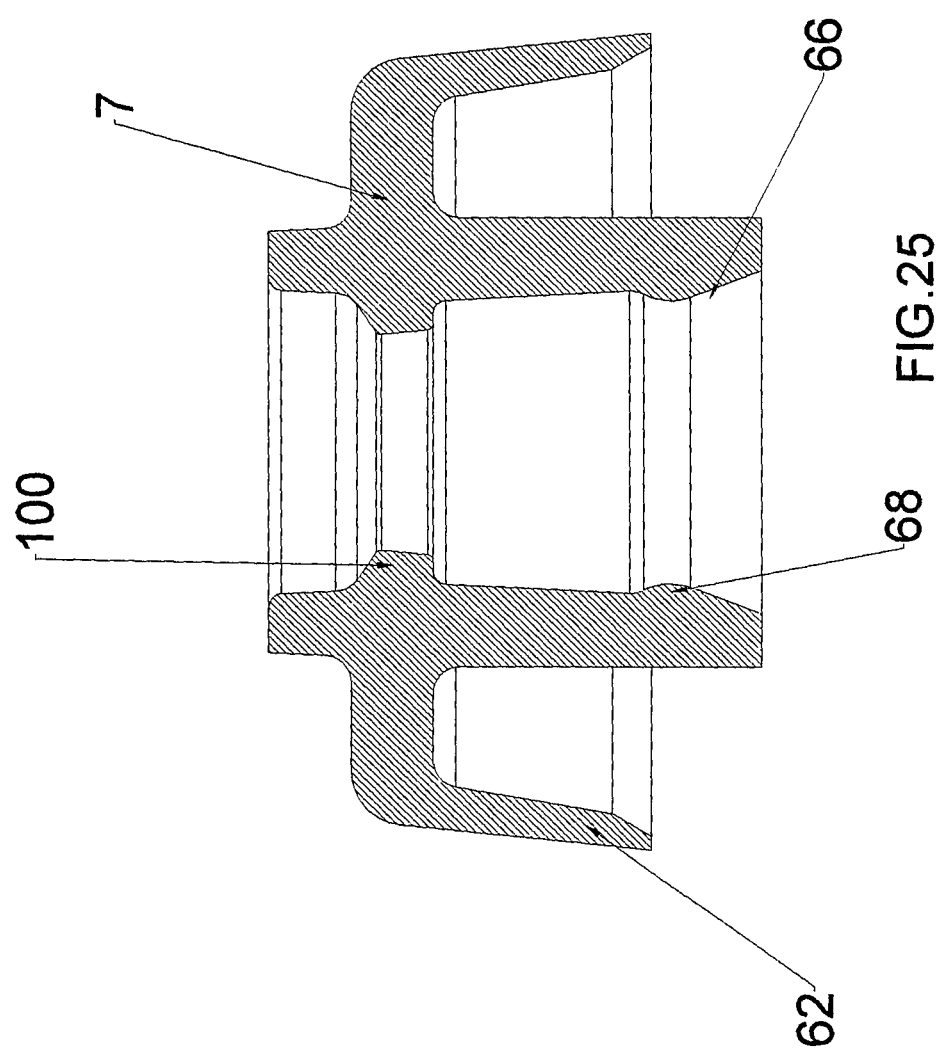
FIG. 25 is a side sectional view of the valve means of FIG. 24.
Figure 26:
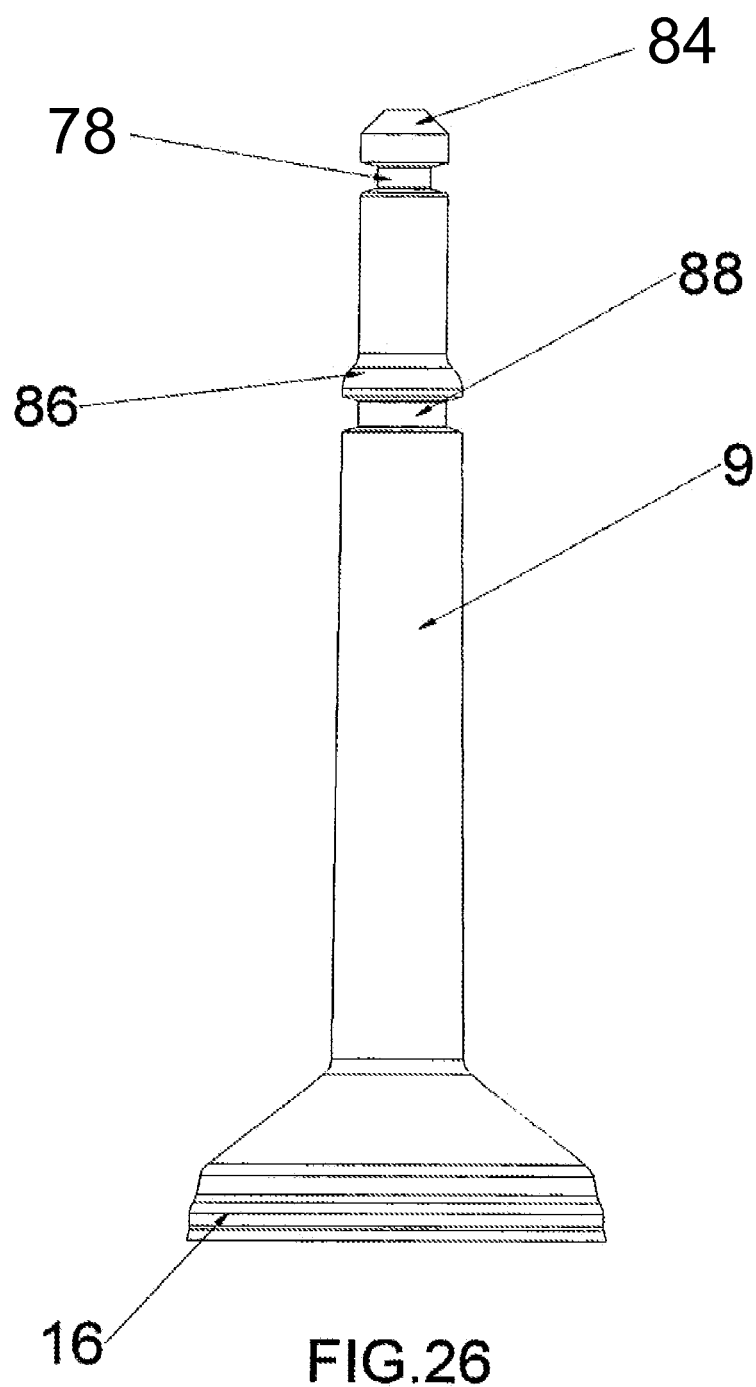
FIG. 26 is a side view of the stem means of FIG. 8.

In particular, FIG. 8 shows a first variation of the stem 9, while FIGS. 22 and 23 show a variation with wings 98 for centering the stem 9 in the cylindrical part 5 of the body 3.

Figure 29:
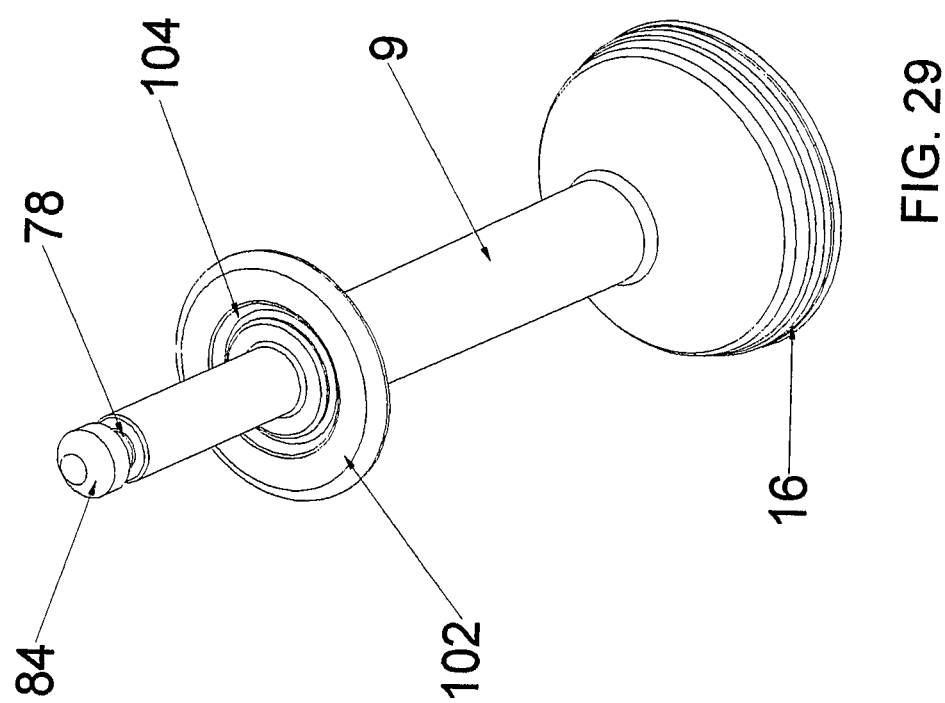
FIG. 29 is a perspective view of a further variation of the stem means of the inventive tap adapted to be used with the tap of FIG. 27.
Figure 30:
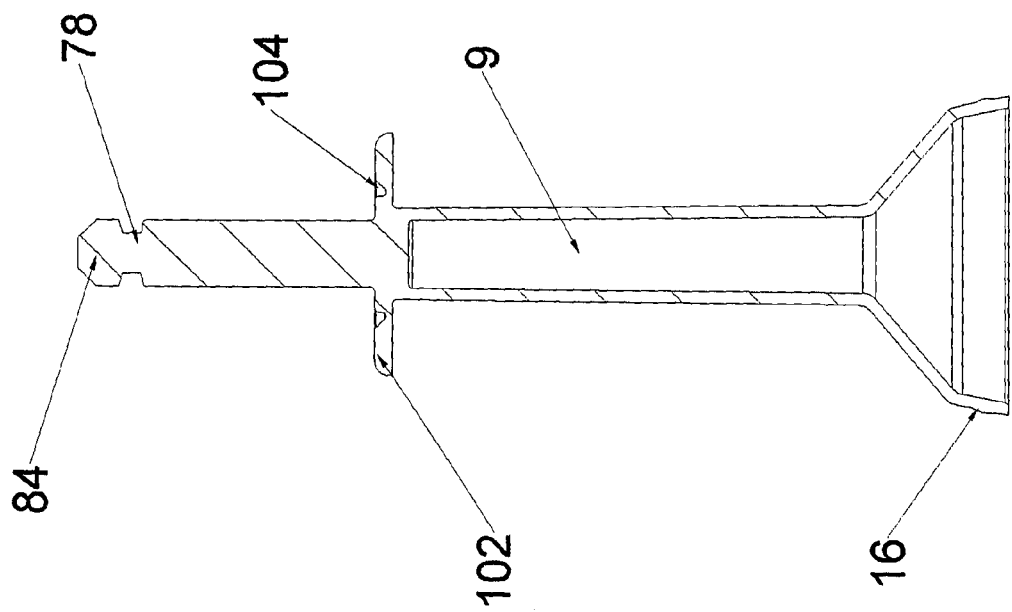
FIG. 30 is a side sectional view of the stem means of FIG. 29.
Figure 31:
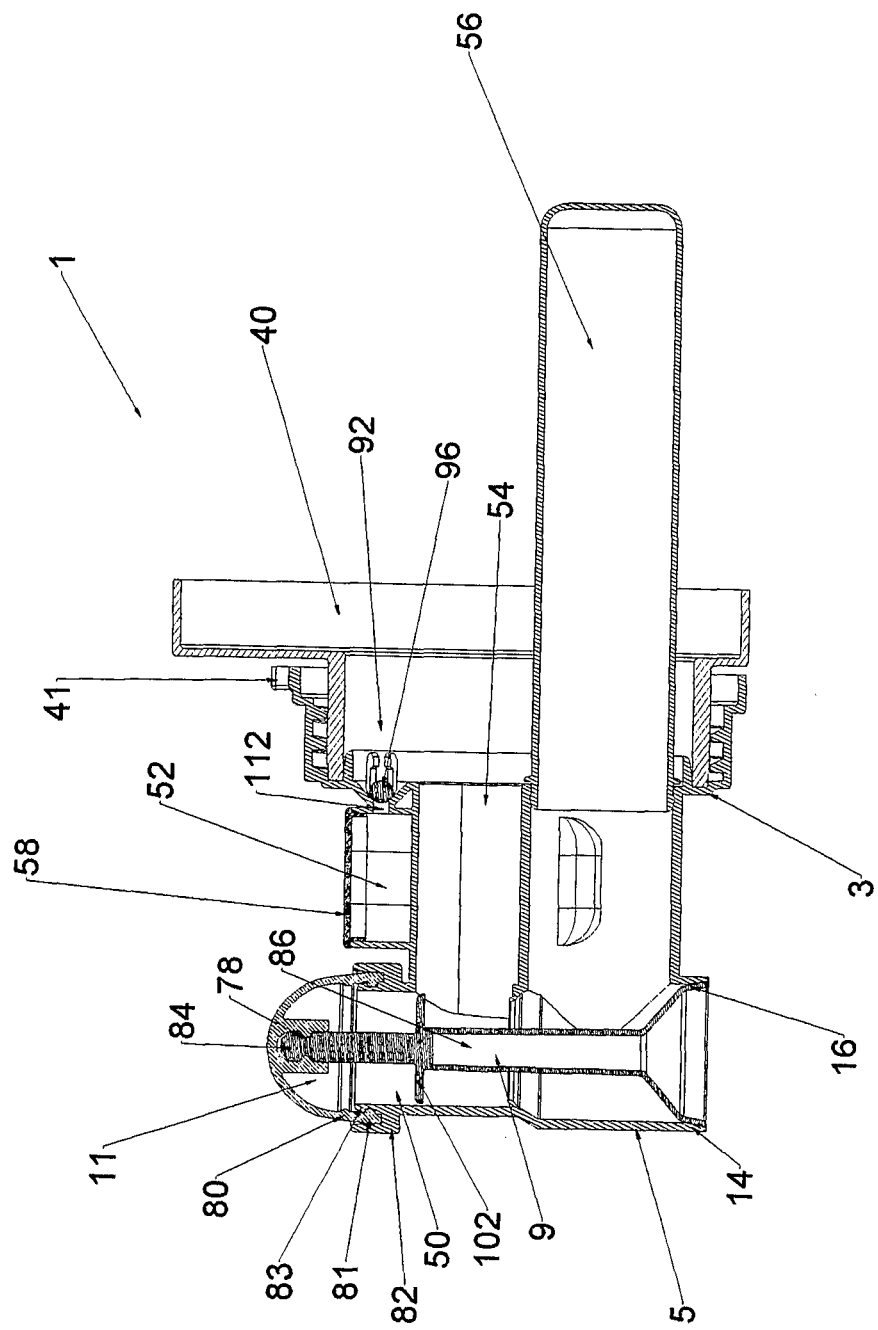
FIG. 31 is a side sectional view of the third embodiment of the inventive tap in its closed position.
Figure 32:
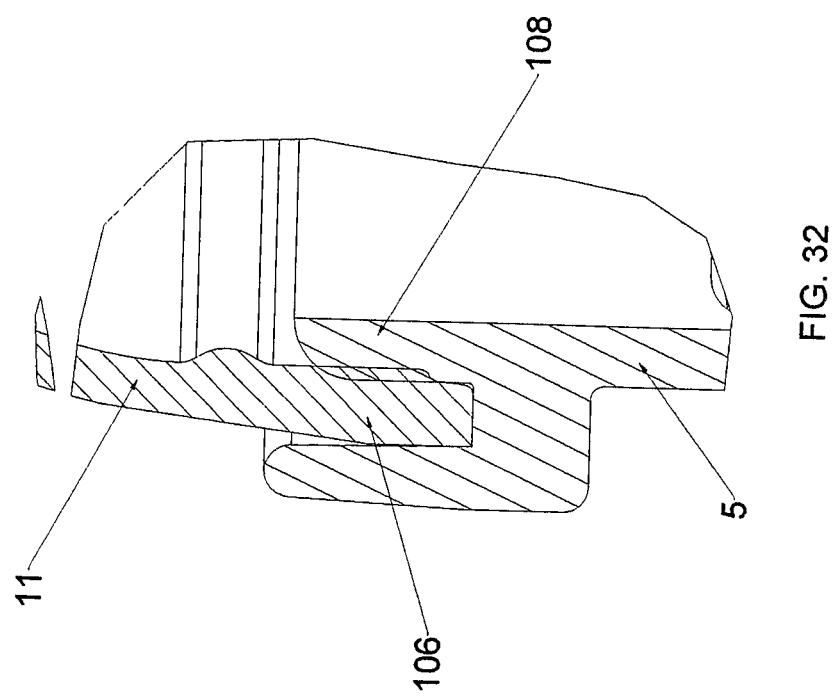
FIG. 32 is a detailed view of the coupling area between actuating means and body of the tap of FIG. 31.

FIGS. 29 and 30 show another variation of the stem 9, in which the stem 9 is made in a single piece with the valve, which in this alternative version is designated by reference number 102. Such valve 102 opens and closes main supply channel 54 and is equipped with a weakening point 104 that allows it to flex to obtain the sealing condition upon closing the main supply channel 54, and to flex also along the other direction when the element is assembled from below and must pass, due to the slanted geometry present on the body, the holding tooth, when liquid is delivered, as can be well seen in FIG. 27. As can be seen in FIG. 31, instead, when delivery ends, the valve and stem assembly 102 opens the main supply channel 54 again, putting it again in communication with the main accumulating tank 56, and allowing to fill the main accumulating tank 56 again with liquid to be delivered, due also and above all to the intermediate tank 52 directly connected to the main accumulating tank 56, that allows venting air inside the container by means of the venting channel.

The inventive tap 1 can also be equipped with warranty seal means (not shown) of a known arrangement for taps of this type: such seal means guarantee tap 1 and container connected thereto against a possible tampering. For such purpose, they prevent the operating actuation of the tap 1 when they are present, while when they are removed (for example through a tearing-type opening due to suitable projecting tongues that can be grasped) allow activating the tap 1 and operating it for opening and closing.

The described dosing tap 1 is composed of few parts, all preferably made of plastics and therefore already adapted for recycling, differently from those known in the market that are composed of plastics and metal, and is able to deliver a pre-established and constant portion of liquid.

One of the advantages that this tap 1 provides is that the dose of liquid to be delivered can change by performing small modifications to the die (or the sizes of a part) that produces the main component, namely the body 5 of the tap 1 or of the main accumulating tank 56 in case of a non-compact version.

Figure 27:
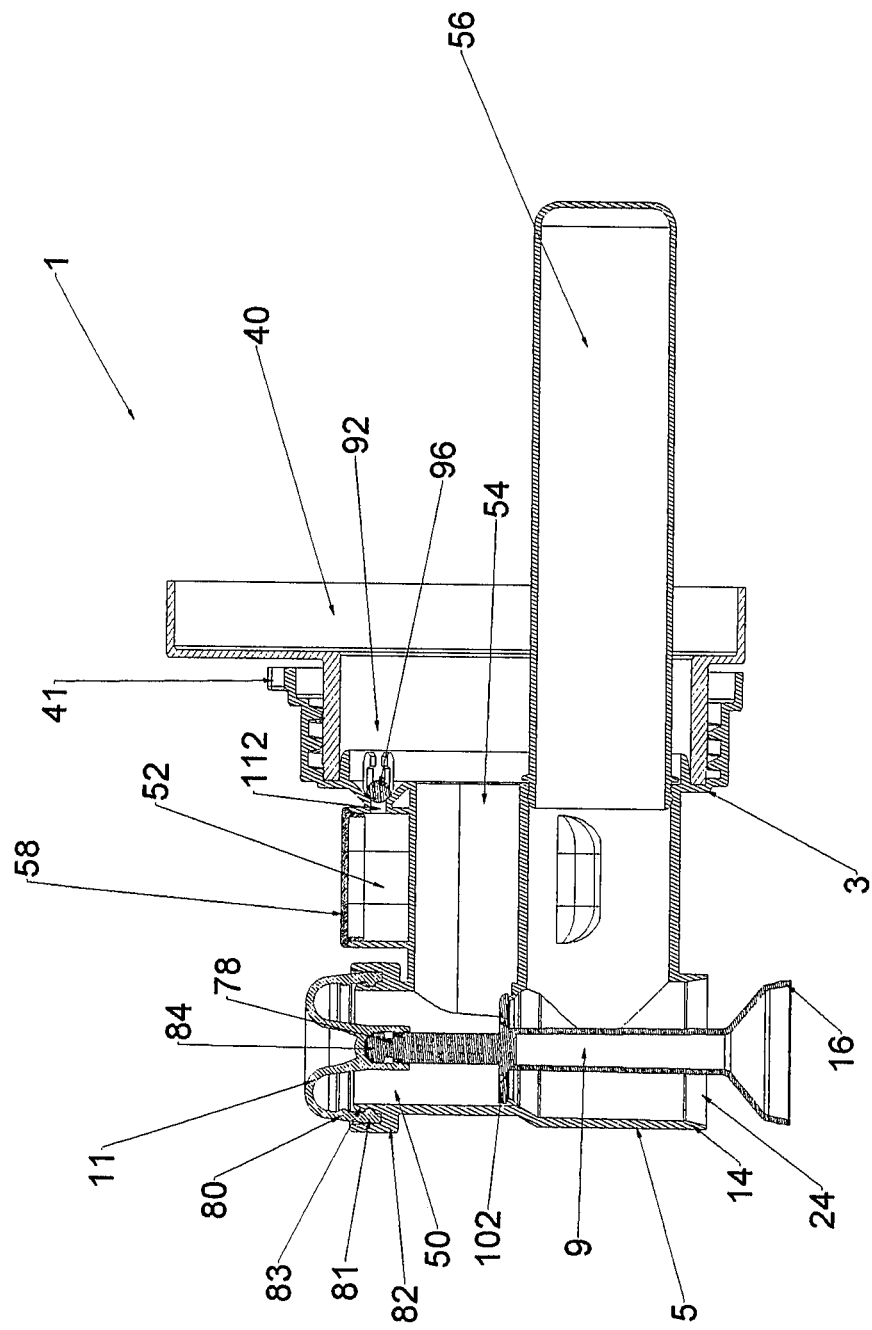
FIG. 27 is a side sectional view of a third embodiment of the inventive tap in its open position.
Figure 28:
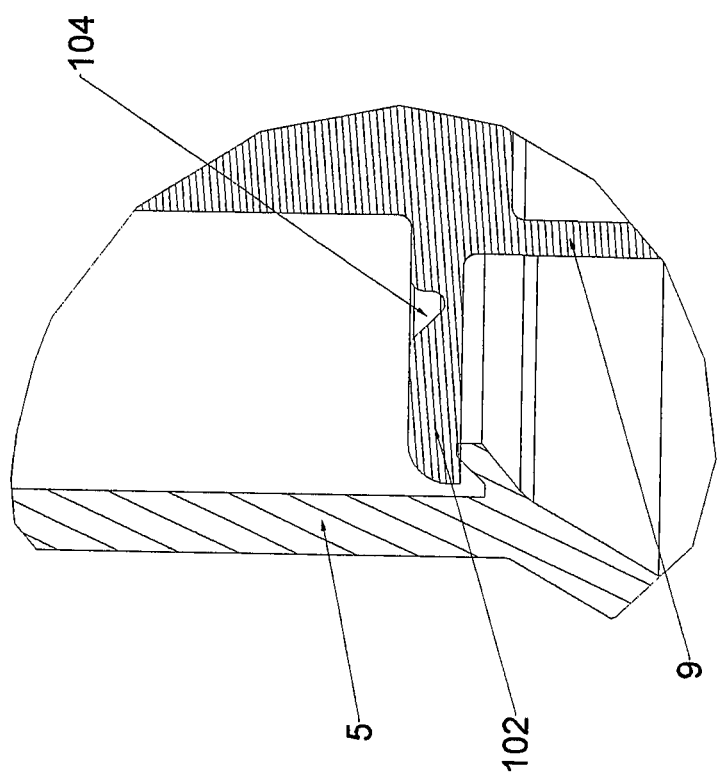
FIG. 28 is a detailed view of the coupling area between stem means and body of the inventive tap.

The described tap 1 is formed of 7 parts made of plastics (6 parts if the version with stem in a single piece, shown in the version in FIG. 27, is taken into account), that make the application totally capable of being recycled (without having to disassemble the tap before rejecting it, to divide plastics from metal) and inexpensive, both as production, and as final sales price.

As regards the main body 5 of the tap 1, it is formed (in the first version with the body in the more compact version shown in FIG. 1 to 13) of a single piece made of plastics, that performs different functions that allow obtaining the perfect application operation, particularly the accurate repeatability of the dose to be delivered.

The upper part of the front cylinder 5, that also composes the main chamber 50 of the tap 1, is equipped with wings 82, that will be used as opposition elements to the fingers of a hand to allow squashing the elastic button 11 and consequently opening the delivering/dosing tap 1, and as liquid fastening/sealing area of the elastic button 11.

The front cylinder 5 is suitably shaped with a line that allows having two different diameters on the same cylinder. On the upper part, the one next to the wings 82, there is a smaller cylinder where the internal sealing valve 9 will slide and make a seal.

On the lower part, there will be a greater diameter that will allow a greater delivering hole (and also a main chamber 50 that will contain part of the dose to be delivered and will minimize the size requirements of the main accumulating tank 56), that in turn will facilitate quick emptying of the main accumulating tank 56 with the dose of liquid to be delivered.

In parallel with respect to the above-described front cylinder 5, there is the intermediate tank 52 for accumulating and checking the performed charge of the dose of liquid and for venting in the main accumulating tank 56.

Figure 1:
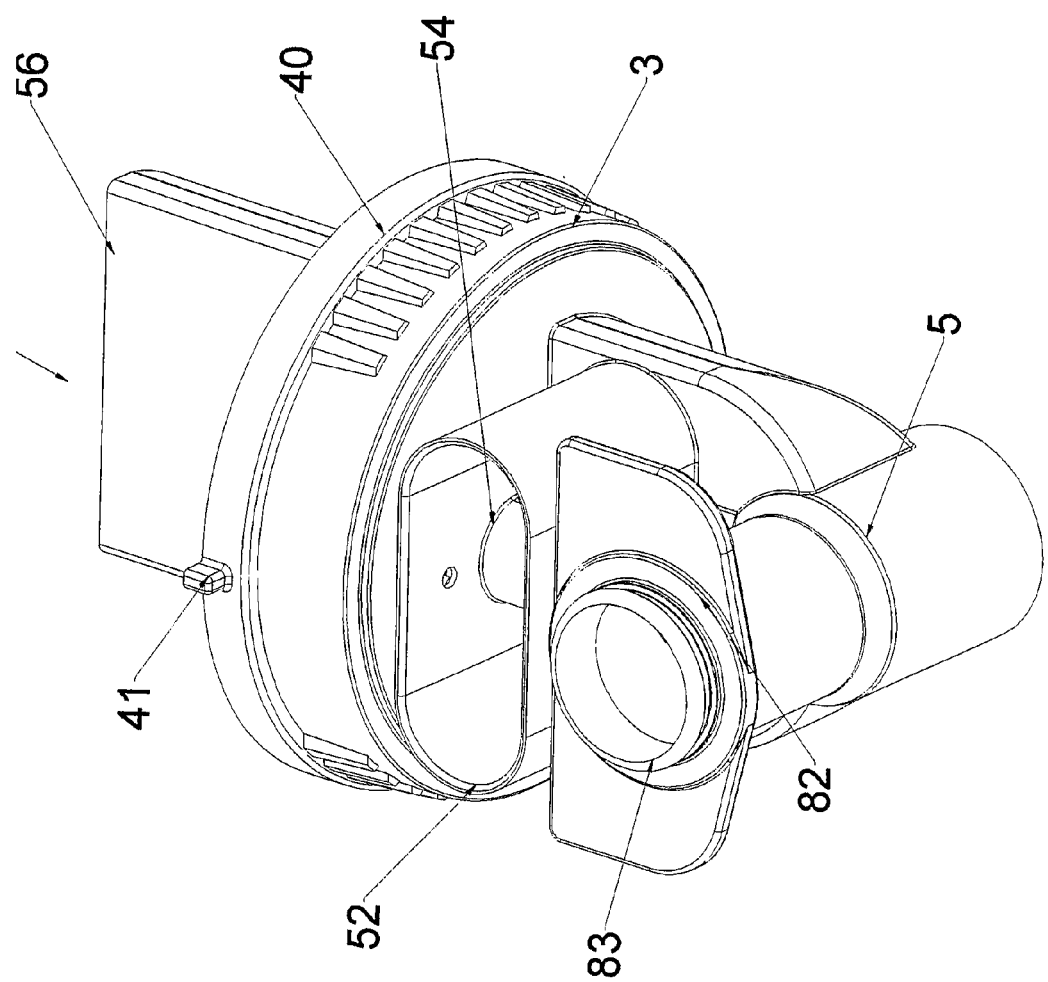
FIG. 1 is a perspective view of the central body of a preferred embodiment of the dosing tap of the present invention.
Figure 2:
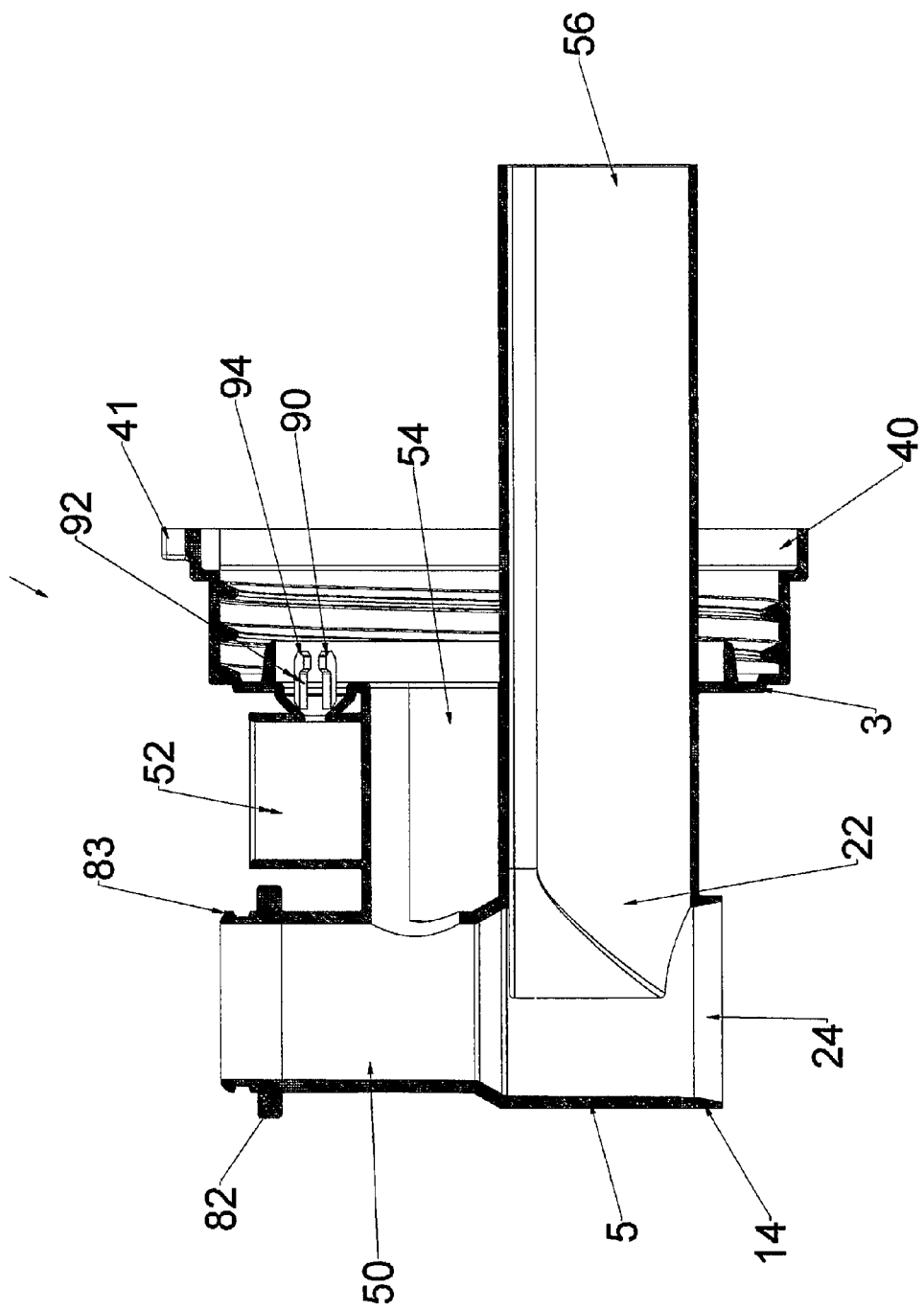
FIG. 2 is a side sectional view of the tap of FIG. 1.
Figure 3:
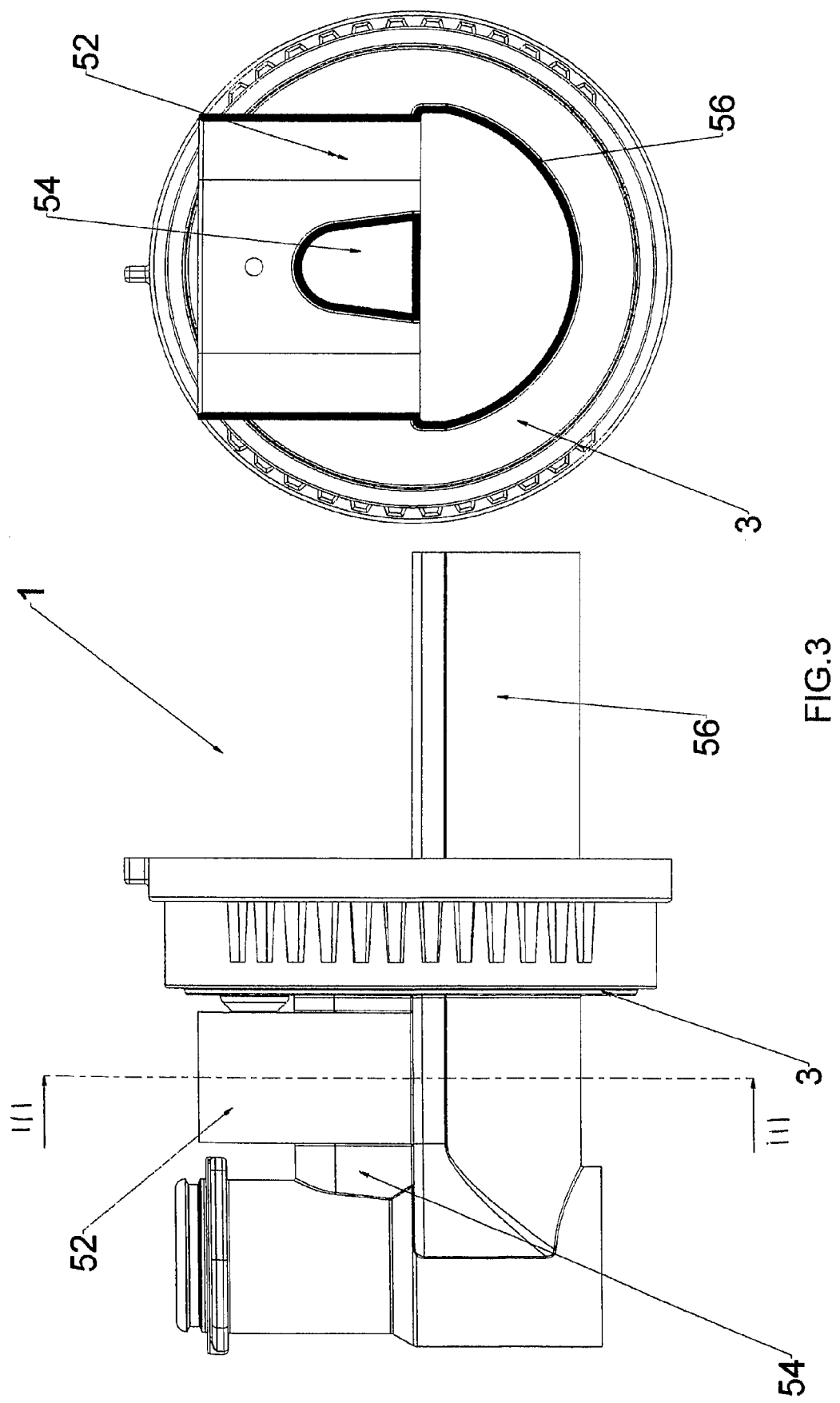
FIG. 3 is a side view of the tap of FIG. 1 with related sectional view performed along line III-III.
Figure 5:
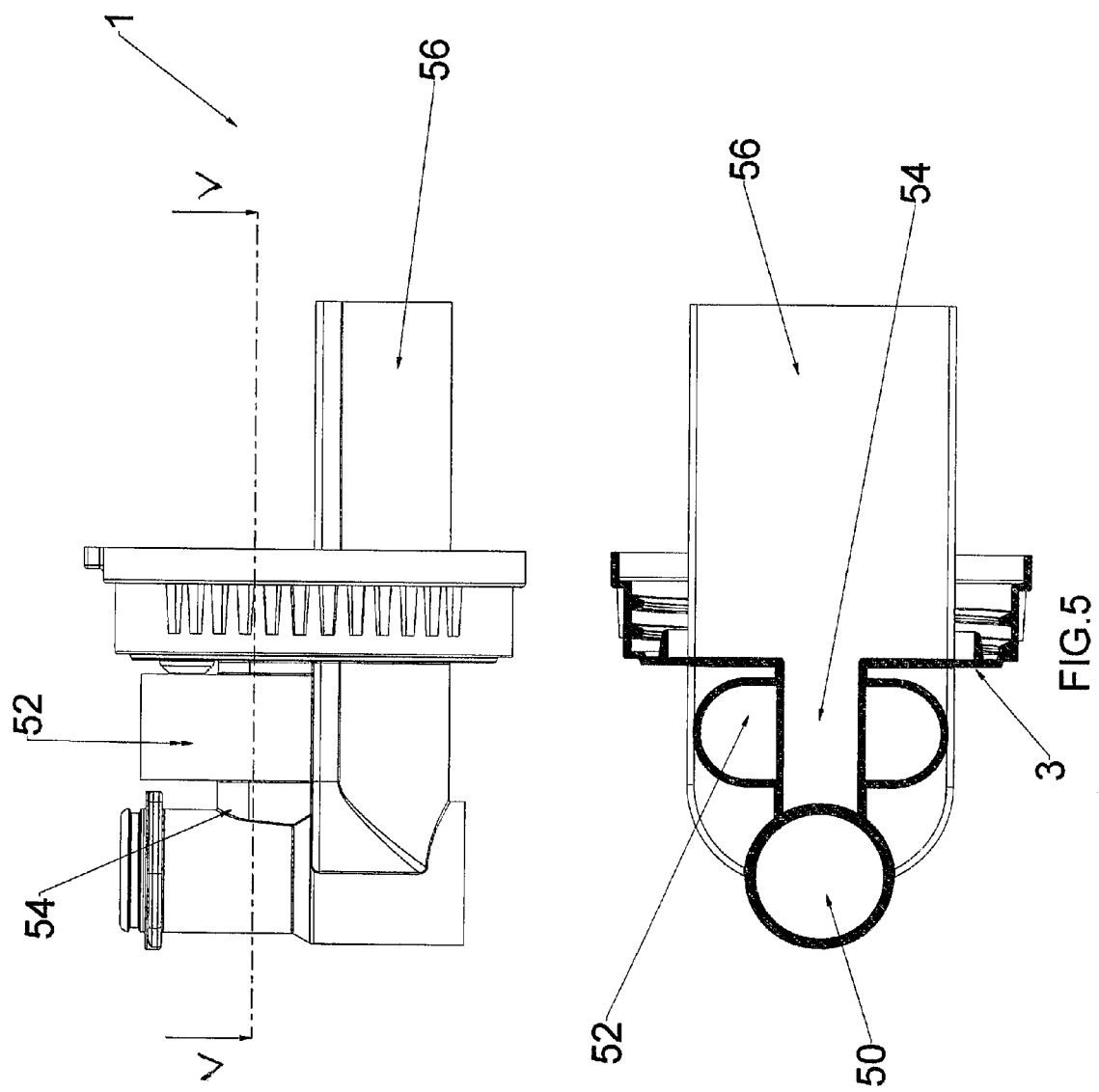
FIG. 5 is a side view of the tap of FIG. 1 with related sectional view performed along line V-V.
Figure 6:
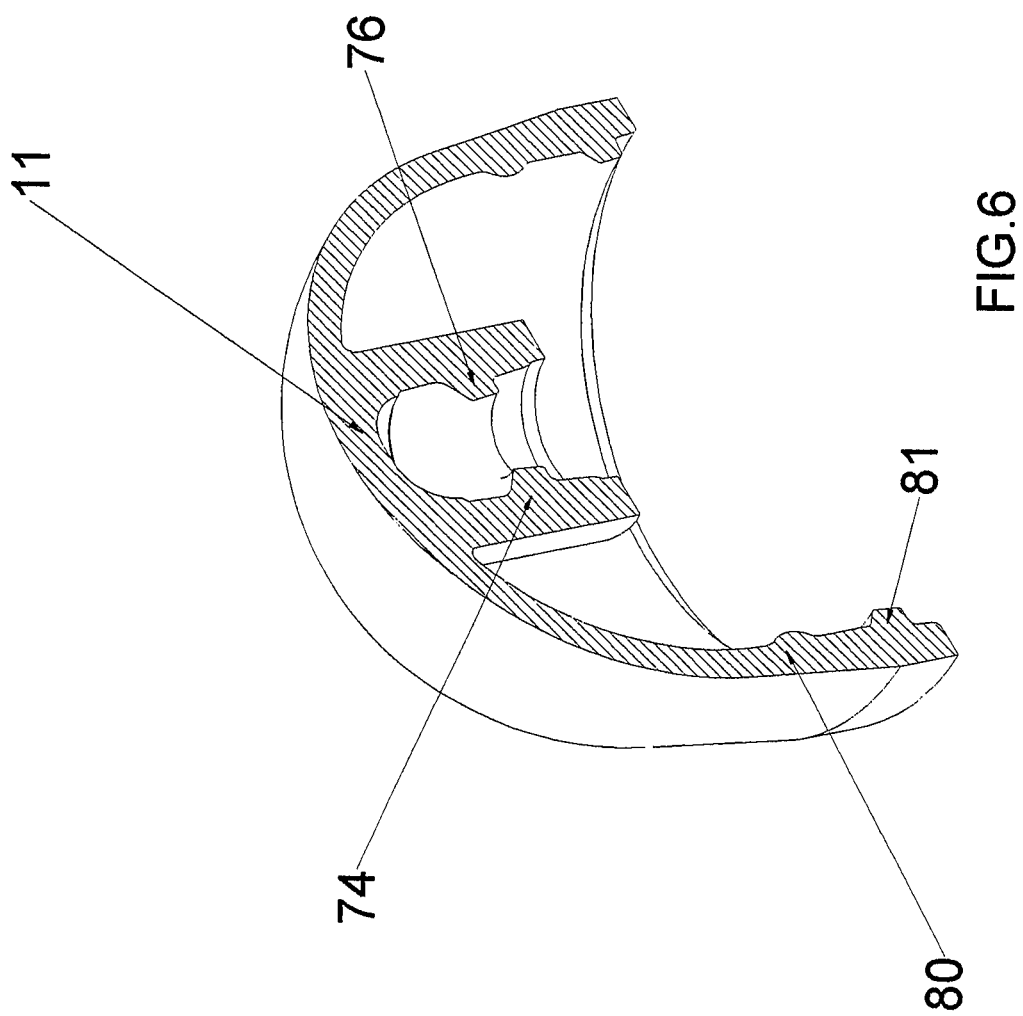
FIG. 6 is a cutaway perspective view of the actuating means of the inventive tap.
Figure 7:
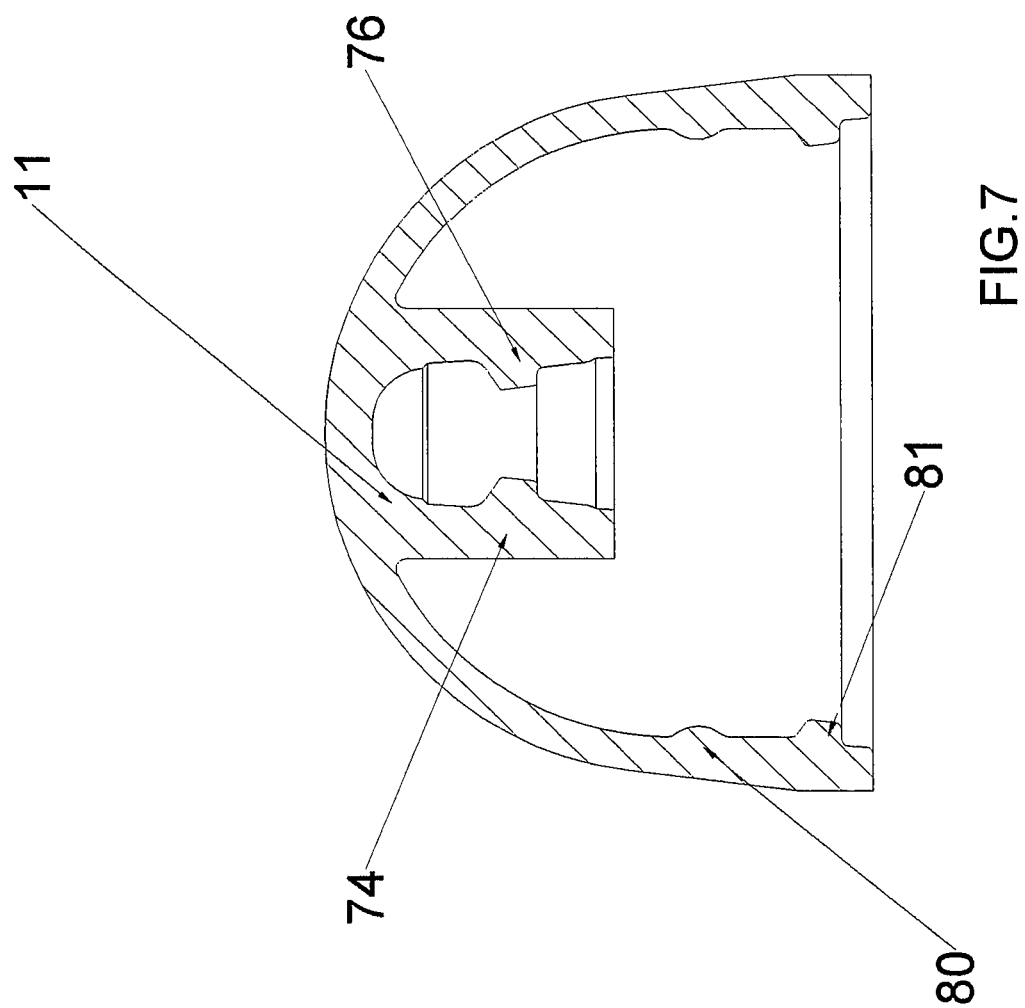
FIG. 7 is a side sectional view of the actuating means in FIG. 6.

FIG. 5 also shows a main supply channel 54, that is the one directly connecting the main container (for example, a rigid container or the "soft" or "semi-soft" containers commercialized under the CHEER PACK™, STAND UP POUCH™, and BAG-IN-BOX™ trademarks and the like) with the front cylinder 5, but not directly with the intermediate tank 52 and the main accumulating tank 56.

The main supply channel 54 terminates at the liquid outlet hole on the lower diameter of the front cylinder 5. In this way, its opening and closing for delivering will be checked by the valve 7 that in turn is connected to the stem 9 and the elastic button 11.

As shown, the elastic button 11 connects and controls the stem 9 (and forms the airtight seal of the tap in its front part), to which the valve 7 is connected. It allows opening and closing the main supply channel 54, simultaneously with the return force of the elastic button 11, that allows re-closing the tap. The valve 7 has geometries that allow anchoring and liquid sealing on the body 5. Also this geometry can be geometrically changed, always obtaining the same result.

Function of the handling stem 9 instead is driving the main opening and closing of the tap 1 to allow delivering a pre-arranged dose. Instead, the valve 7 is shaped in order to have two flexible lips (it is also possible to make a version with a single lip) 61, 62, that allow sliding the piece (driven by the stem 9 and the elastic button 11) and liquid sealing, without creating an excessive friction effort, and therefore allowing an easy automatic closure dictated only by the return force of the elastic button 11.

Moreover, it allows closing the main supply channel 54 that projects on the lower diameter of the main chamber 50 of the body 5 when delivering the dose, which otherwise would be impossible because the main supply channel 54 would continue to supply the main accumulating tank 56 (and consequently the dose).

The purpose of the ball 96 (or more generally any type of valve placed in the tap system of the invention) is closing/opening the venting channel 112. The valve 90 is preferably of the ball type, but can also be replaced (by means of a small change of geometry) by silicone valves with different shapes.

Ball type embodiments of valve 90 can include a plurality of elongated arms 94 equipped at one end with holding teeth 96.

The ball 96 (or anyway any other type of valve that will be present on the application) will have to be sensitive to the change of pressure in order to provide an immediate opening and closing response of the air channel. It will open when, once having delivered the dose and once having closed the tap 1, the recharge of the liquid dose will have to be made. Air present in the various chambers will have to pass through the venting hole in order to be vented inside the container, and therefore the air pressure (created by the dose of liquid that is entering the various chambers) will push the valve and open the air passage. When instead the tap will be opened to deliver the dose, the valve, driven by the liquid pressure, will close the air passage avoiding that liquid goes out from it, that would increase the dose and be blocked (in care there is no valve) only when a balance is created between pressure inside the container and atmospheric pressure. It will also be possible to remove the valve that checks the air passage, but in this case it will be necessary to use the filling machine that, when filling, will have to slightly squash the side walls of the container, while it performs the filling, so that, once having screwed or engaged the tap and therefore once having closed the system, the pressure inside the container will never be greater than the external pressure, so that, when delivering, there will be a suction effect from the air hole, that will tend to recall air inside the container and not to leak liquid, as in case of a high pressure inside the container.

For the correct application operation, moreover, it is necessary that the intermediate tank 52 and the main accumulating tank 56 (that are open in order to minimize molding costs) are then operatively closed by two plugs 58 and 60, respectively, or by two welded films (not shown).

Figure 17:
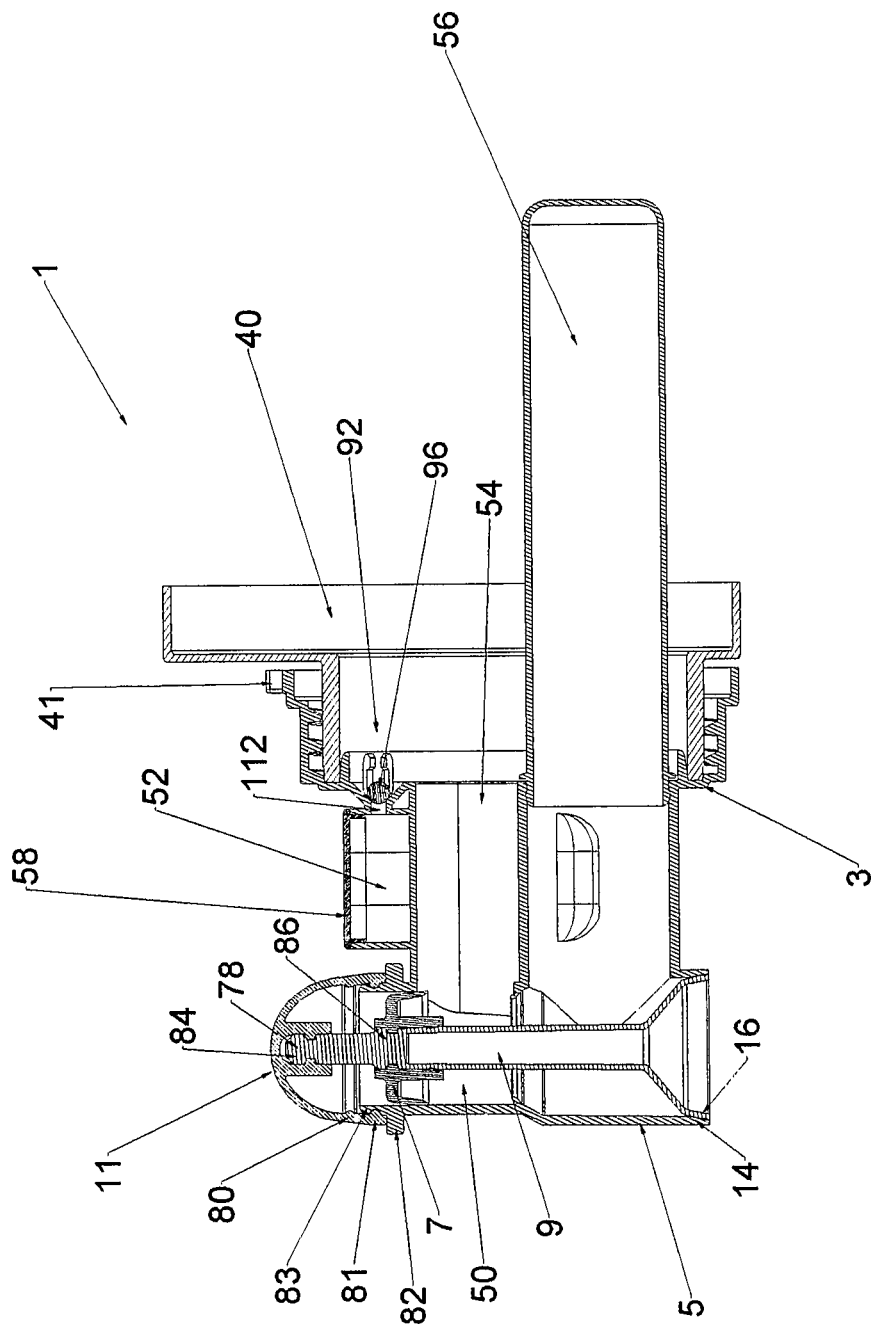
FIG. 17 is a side sectional view of the second version of the tap of FIG. 14.
Figure 18:
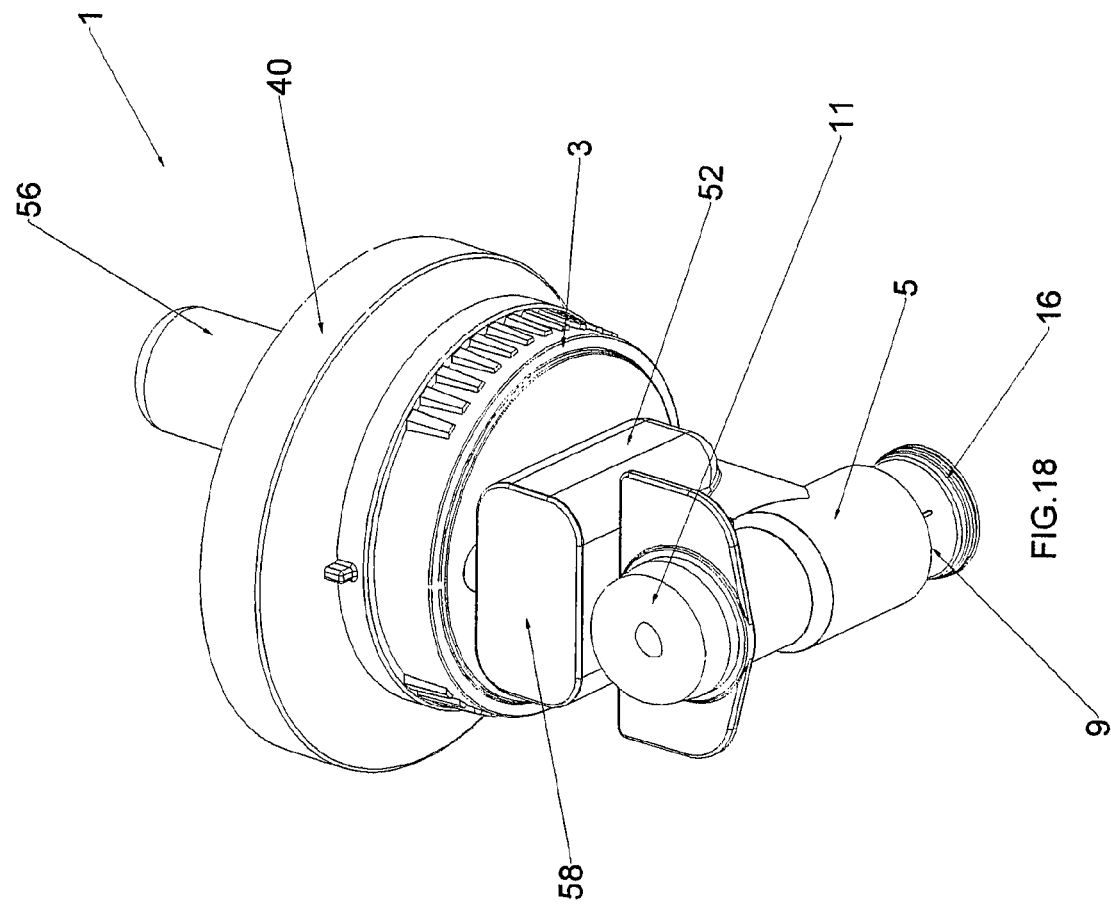
FIG. 18 is a perspective view of the second embodiment of the inventive tap in its open position.
Figure 19:
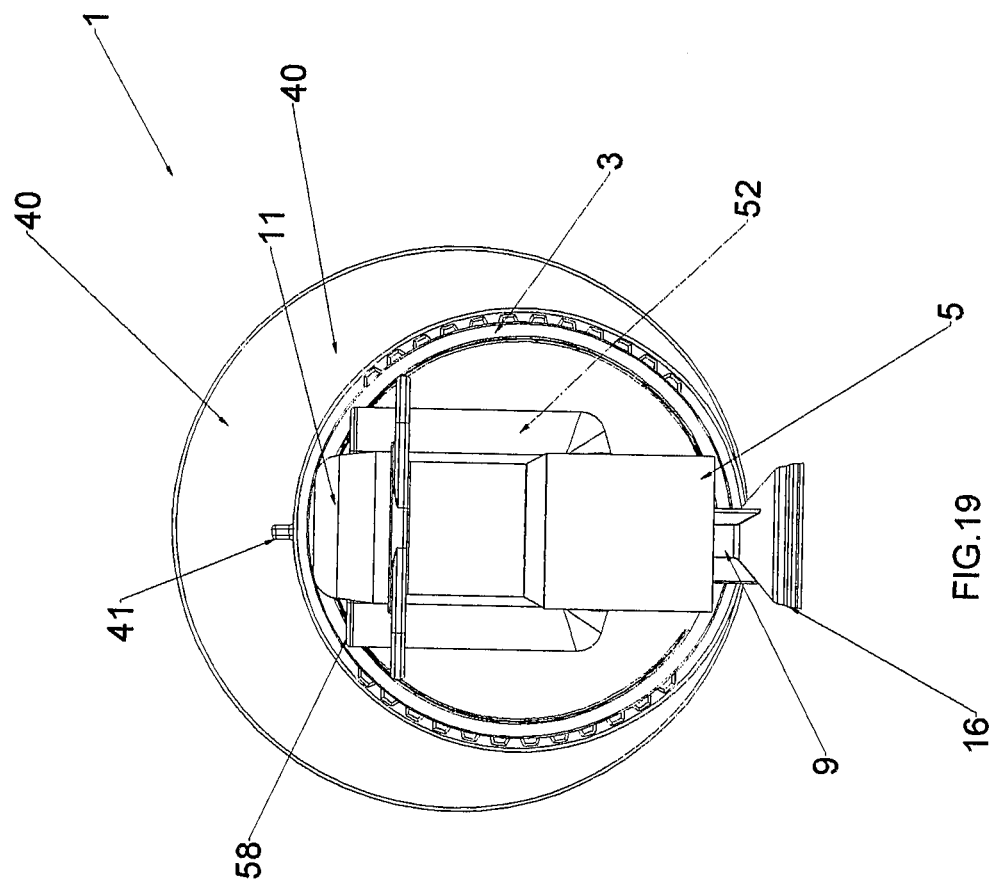
FIG. 19 is a front view of the tap of FIG. 18.
Figure 20:
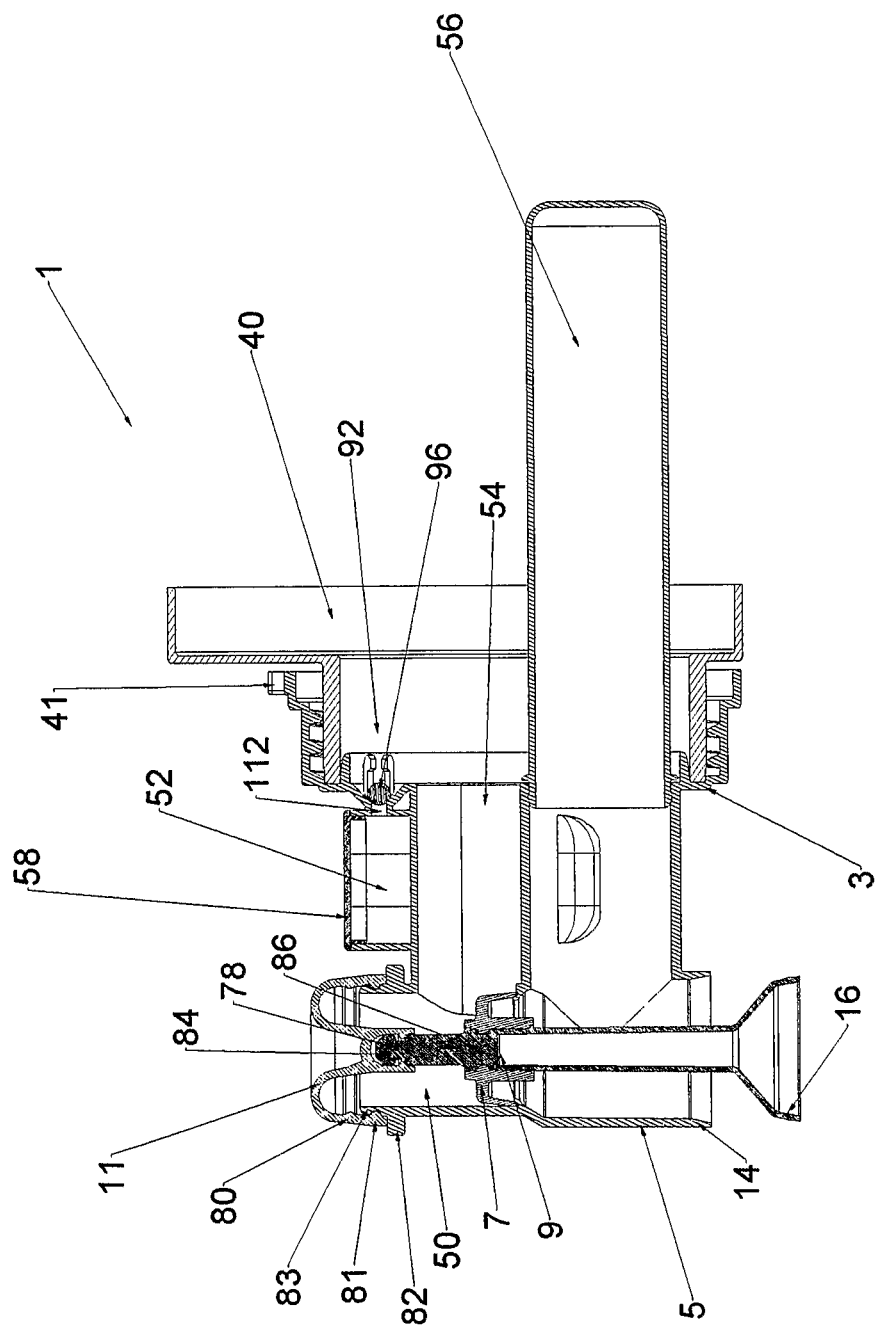
FIG. 20 is a side sectional view of the tap of FIG. 18.
Figure 21:
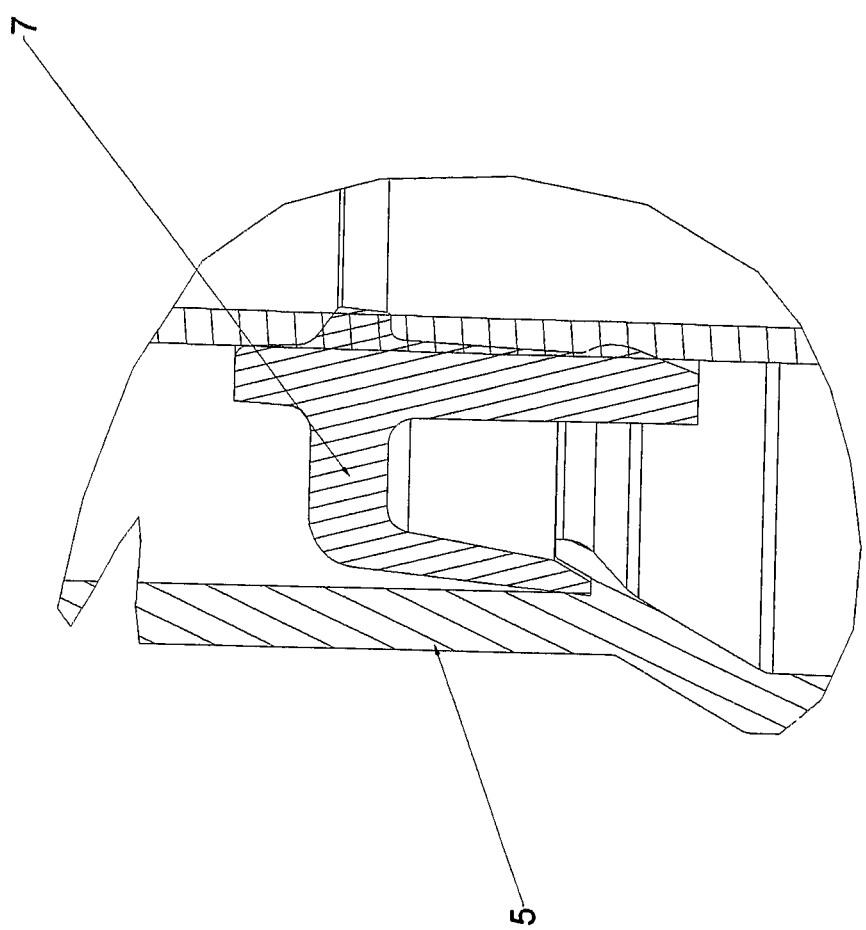
FIG. 21 is a detailed view of the coupling area between valve and body of the tap of FIG. 18.

As better shown in FIGS. 17 and 20, in the tap version in which the main accumulating tank 56 is a separate piece from the body 5, only one plug 58 or one welded film will be needed for the intermediate tank 52, while the main accumulating tank 56 is already per se a closed piece.

With regard to the operation of the inventive tap 1, starting from the closing position shown in FIG. 11, 17, 31 or 33, the tap 1, connected to a main container that contains a liquid, allows liquid in the main cylinder 5 to enter the main supply channel 54, to which it is directly connected. That is, the outlet hole of the liquid from the main supply channel 54 ends on the cylinder with the smaller diameter (the one where the internal valve slides) of the front cylinder 5. The liquid then flows from the upper part of the front cylinder of the body 5 (defining a smaller diameter where the valve 7 will slide), to the greater diameter of the front cylinder 5, and eventually into the main accumulating tank 56.

The primary accumulating tank 56 is directly connected to the intermediate tank 52, that in turn is connected, by means of the venting channel 112 with the valve 90 or similar types, to the main liquid container.

While the main accumulating tank 56 is filling with liquid, air that was contained in the various chambers of the tap 1 is pressurized and this pressure (because the main accumulating tank 56 is directly connected to the intermediate tank 52 that is equipped with this air venting channel 112 inside the main container driven by a valve 7) makes the valve 90 that controls the venting channel 112 of the intermediate tank 52 move the ball 96, and that air enters the main container. In this way, liquid takes the place of air that, in a closed cycle, enters the main container.

Figure 12:
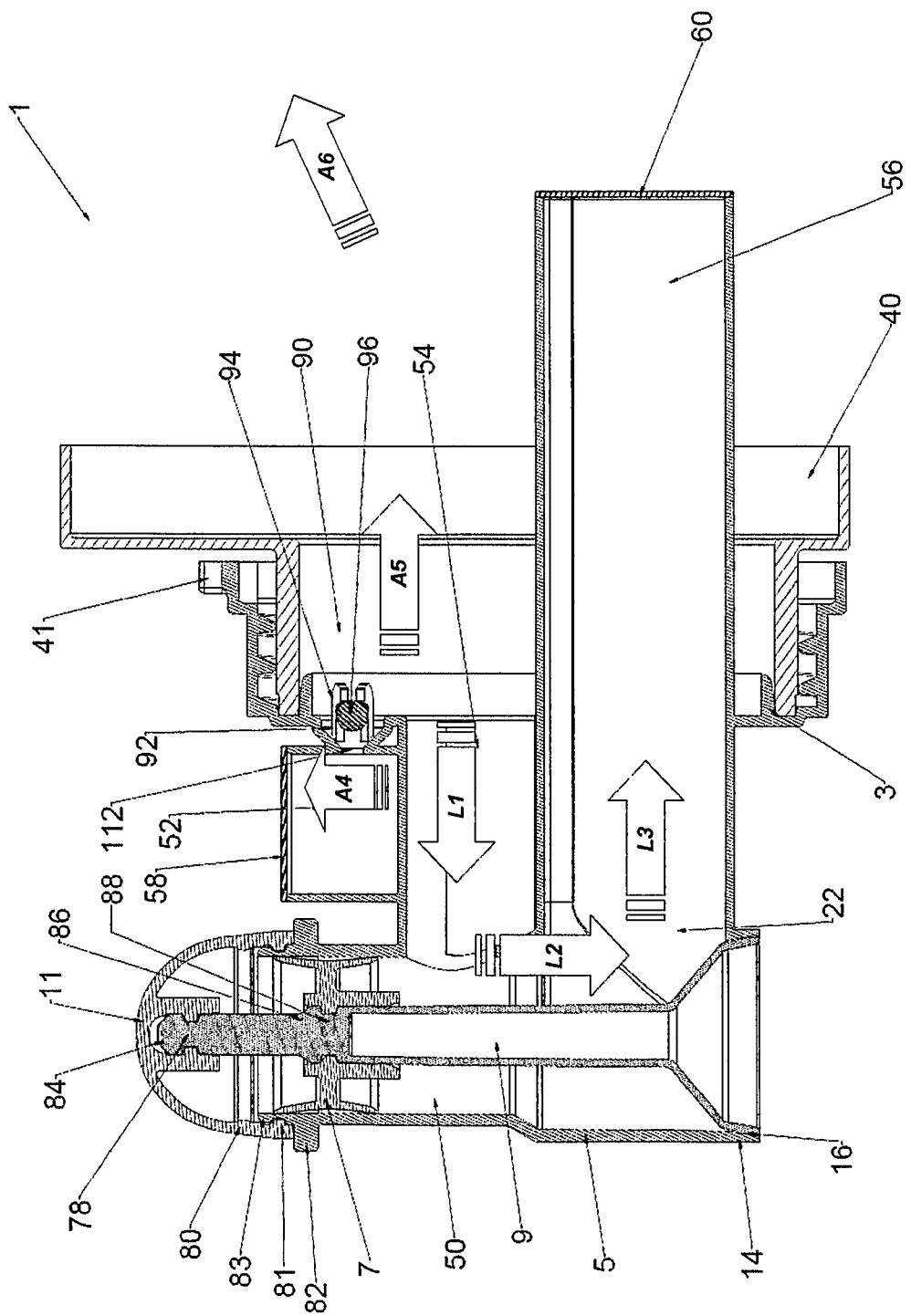
FIG. 12 is a side sectional view similar to FIG. 11 that shows the movements of liquid and air imposed by the various connections between the various chambers inside the tap.
Figure 13:
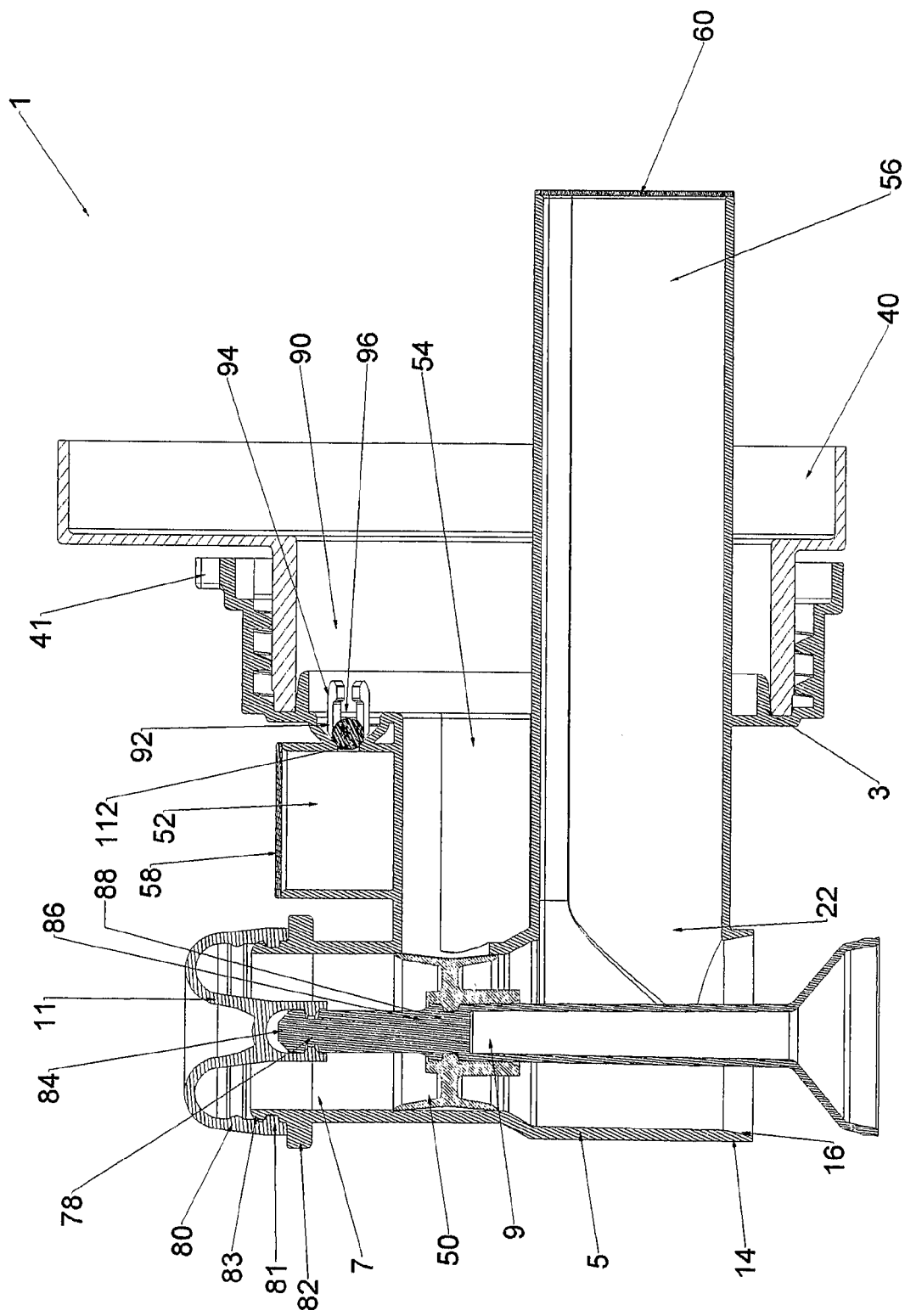
FIG. 13 is a side sectional view of the complete tap of the invention in its open position.
Figure 14:
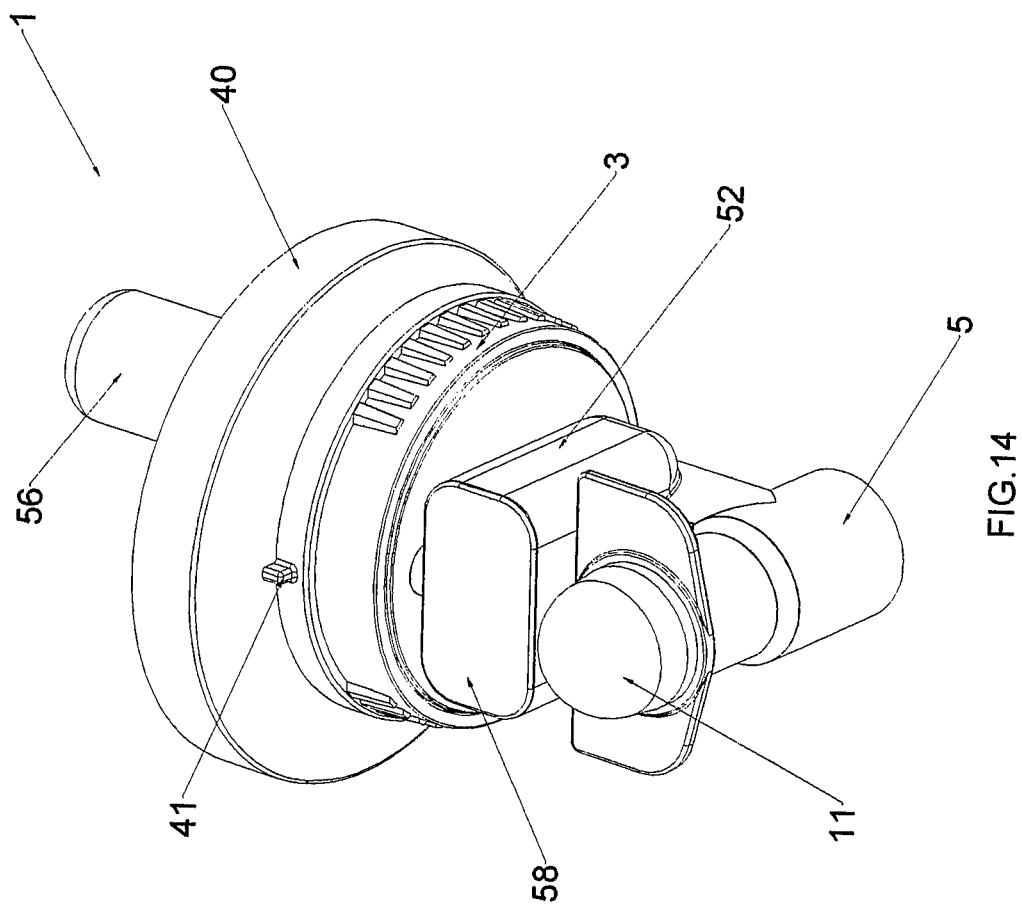
FIG. 14 is a perspective view of a second embodiment of the inventive tap in its closed position.
Figure 15:
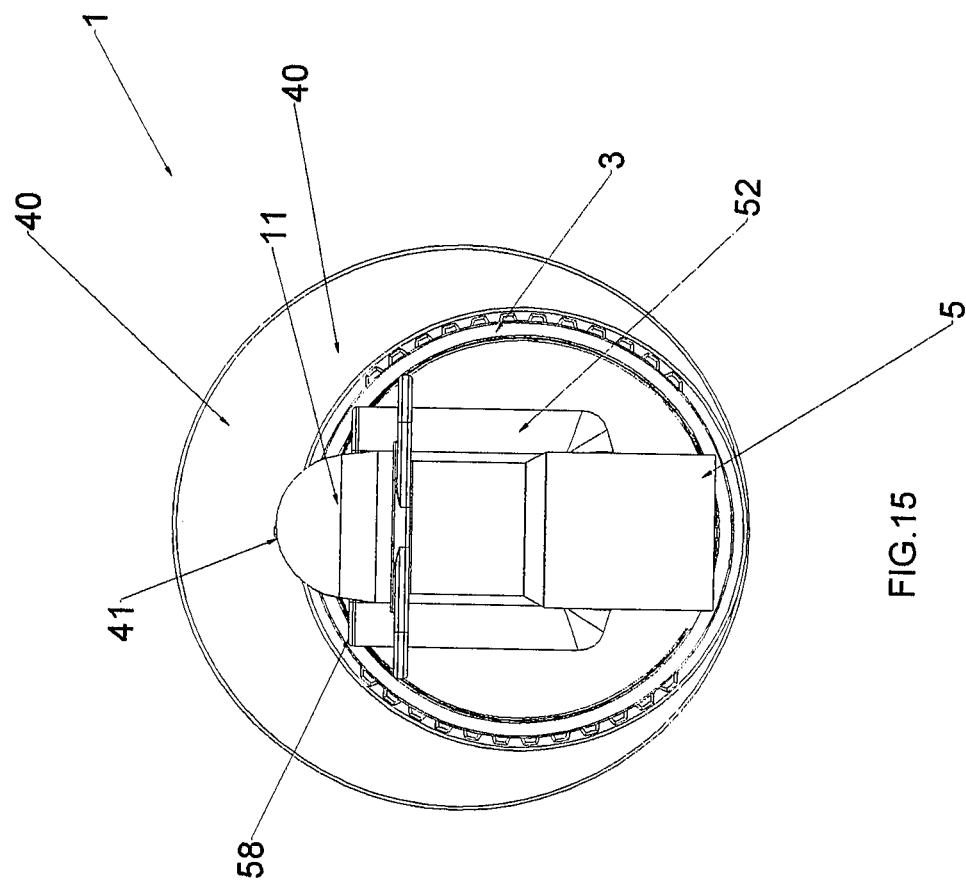
FIG. 15 is a front sectional view of the tap of FIG. 14.
Figure 16:
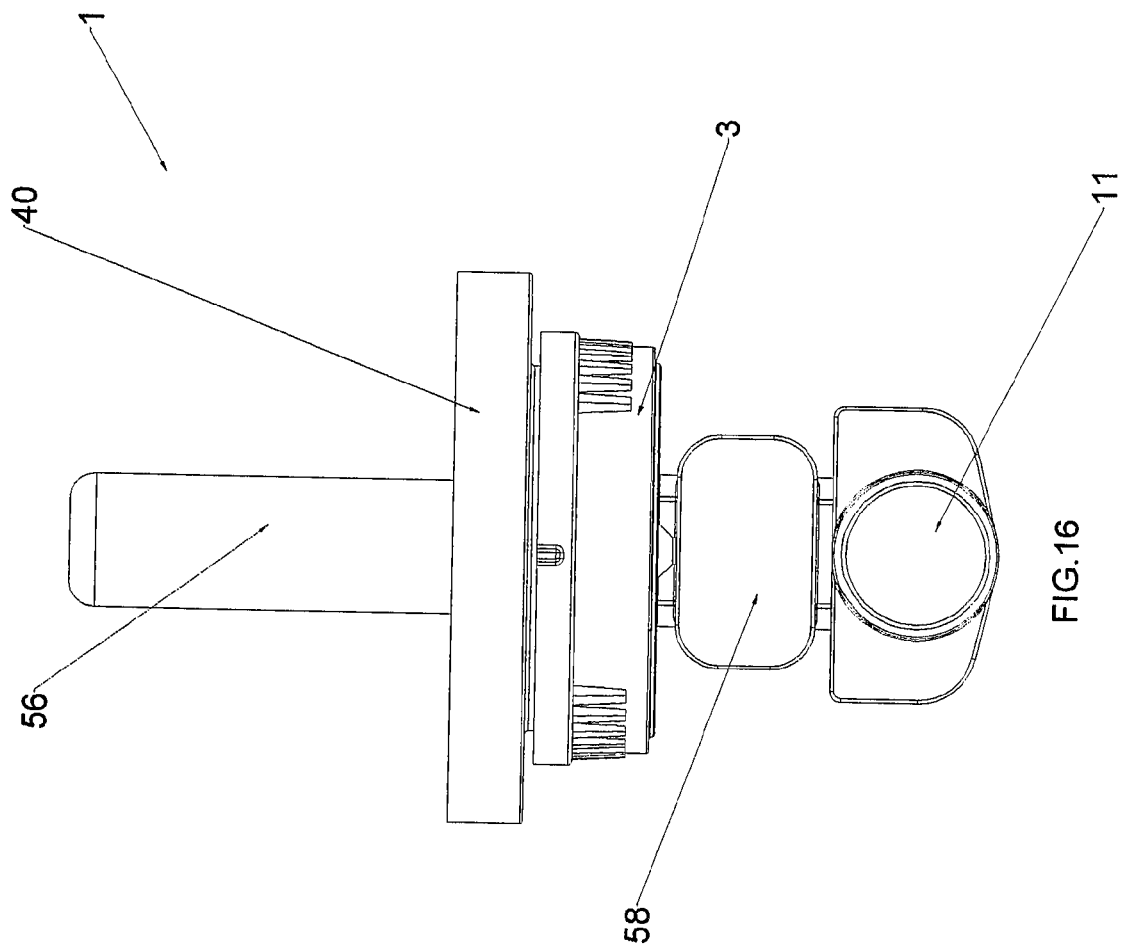
FIG. 16 is a top view of the tap of FIG. 14.

In FIG. 12, arrows L1, L2, L3 show the path of liquid that enters, while arrows A4, A5, A6 show air that gets pressurised and opens valve 90 and allows air venting inside the container, that in this way replaces the air volume with the portion of liquid volume to be delivered in the dose.

When opening, as shown in FIGS. 13, 20, 27 and 34, the valve 90 closes the venting channel 112, preventing liquid from going out of the hole. The valve 7, driven by the stem 9 that at the same time the upper button is squashed, closes the main supply channel 54.

At the same time, the liquid outlet hole is freed by the piston 16 and allows delivering the dose and the ball (or more generally any type of valve inserted in the system and sensitive to small pressure changes) closes the venting channel avoiding that liquid goes out from it, that would modify the pre-arranged dose to be delivered.

When releasing the elastic button 11, the tap 1 will automatically go back to its closing position, the venting channel will automatically be opened again, driven by the air pressure pushed by the liquid below that in the meantime is filling the chambers, and the established liquid dose will be recharged.

Summarizing, the inventive tap 1 provides a closed system formed of the tap 1 connected (by screwing, by engagement, or by direct welding) to a liquid container (not shown). This tap 1 has the capability of delivering a pre-established dose, and this dose can be repeated in a constant and accurate way, but can be also changed by simply changing the sizes of the main accumulating tank 56 that, in the version shown in FIGS. 1 to 13, is a single piece with the body 5, while in the versions shown in FIGS. 14 to 34, is a piece apart, that will then be connected (by screwing, by engagement, or by welding) to the main body 3.

The dose in the tap 1 is always ready for delivery, since the charge is made before the delivery itself and it remains always ready for delivering in the chambers of the tap. The various charges are able to be performed because air that is contained inside the main accumulating tank 56 of the tap 1 that will contain the dose of liquid to be delivered is vented inside the container due to the realized closed system by means of a venting channel 112 connected to an intermediate tank 52 (not directly connected to the main element of the tap 1, but to the main accumulating tank 56) driven by a safety valve 90.

Air pressurised by entering liquid passes from the main accumulating tank 56 to the intermediate tank 52, and, always by means of pressure, opens the valve and enters air inside the main container.

Once having vented air inside the container, and then loaded the required liquid dose, delivery of the dose will be performed. Delivery of an accurate dose occurs due to devices that allow opening the main hole of the tap 1 (from where the pre-arrange dose will go out) and simultaneously closing the main supply channel 54 (that will be the one that, once having closed the tap 1, will allow recharging the liquid dose), that is directly connected to the main element of the tap 1.

When delivering, the pressure inside the container will make the air passage valve 90 close, not allowing liquid to go out when delivering, thereby preventing that the dose to be delivered is modified.

Also summarizing the arrangement of the connections, it must be recalled that there are direct connections between main supply channel 54 and main chamber 50 of the tap 1, between main accumulating tank 56 and main chamber 50 and between main accumulating tank 56 and intermediate tank 52.

Instead, there are indirect connections between intermediate tank 52 and main container through the venting duct 112, or better the venting duct 112 directly connects the main container with the intermediate tank 52, and therefore the connection must be considered direct only due to the presence of the valve (that is self-controlled when opening and closing), between main container and main chamber 50 by means of the main supply channel 54 (that is closed when opening the tap 1).

This operating principle can be applied also by changing shapes, geometries, movements and arrangements of the tap 1 (with movements of the various elements on horizontal or vertical or slanted axes by pressing a button or pulling driving elements that move a valve that makes the tap open or close (always with movements of the various elements on horizontal or vertical or slanted axes) or of horizontal, vertical or slanted cam-type opening devices). For example, as shown in FIGS. 33 and 34, the tap 1 can be made by arranging both main supply channel 54, and main accumulating tank 56, and valve 90 in a position slanted by X degrees, in order to facilitate delivering and recharging liquid. This will allow highly improving liquid fluid-dynamics (and therefore inertia) both when loading the liquid dose and when delivering the liquid dose. It will be immediately obvious to the skilled people in the art that numerous variations and modifications (for example related to shape, sizes of the containers on which the tap 1 of the invention will be placed) could be made in order to increase the incidence of liquid inertia to improve filling and emptying the chambers. For example, the first versions of the tap 1 of the invention (that is, those without channels slanted by X degrees), can be utilized while changing the shape of the container on which they will be placed (for example by making containers with non-plane, but slanted bases) in order to obtain the same slanting effect for a better emptying, without necessarily having to complicate molding of the body of the tap (for example by, forming slanted channels are obtained particular die movements that generate a higher cost of the die and consequently of the semi-finished product) without departing from the scope of the invention as claimed in the enclosed claims.

The invention claimed is:

1. A tap for dosing liquids, the tap comprising:
   a body including:
      a connecting part adapted and configured for coupling to a container of liquid to be delivered; and
      a liquid delivering passage;
   a stem adapted to open and close the liquid delivering passage; and
   an elastic button adapted to actuate the stem in between opening and closing positions;
   means for circulating air inside the tap and the container and replacing liquid upon delivery with air;
   means for dosing liquid adapted to prepare for delivery a pre-arranged dose of liquid, the means for dosing being operatively connected to the liquid delivering passage and the means for circulating air; and
   a valve adapted to open and close the liquid delivering passage for the liquid in the means for dosing;
   wherein said means for circulating air and replacing liquid include:
      at least one intermediate tank for air, the at least one intermediate tank directly connected with the means for dosing liquid;
      a venting channel directly connected with the at least one intermediate tank; and
      at least one air venting valve that connects the at least one intermediate tank to the container, the at least one air venting valve being received within the venting channel and adapted to open and transfer air from the at least one intermediate tank to the container when the liquid is delivered from the container to the means for dosing.

2. The tap of claim 1, wherein the intermediate tank is airtight sealed by a plug or by a welded or glued film.

3. The tap of claim 1, wherein the at least one air venting valve is composed of a plurality of elongated arms inside which at least one opening/closing element is placed, the arms being equipped at one end with holding teeth for the opening/closing element.

4. The tap of claim 3, wherein the at least one opening/closing element is a ball.

5. The tap of claim 1, wherein the at least one air venting valve is adapted to be opened and closed with alternative control by pressure of liquid and by pressure of air contained inside the tap and pushed by liquid that is filling the tap.

6. The tap of claim 1, wherein the means for dosing the liquid are composed of at least one main supply channel and at least one main accumulating tank shaped and sized in order to contain the desired dose of liquid to be delivered.

7. The tap of claim 6, wherein the at least one main accumulating tank is airtight sealed by a plug or by a welded or glued film at an opposite end with respect to a delivering end.

8. The tap of claim 6, wherein the at least one main accumulating tank is shaped in order to be closed at an opposite end with respect to a delivering end.

9. The tap of claim 1, wherein the body is a single piece of plastic material, on which a front cylinder is obtained where the valve slides, the valve being operatively coupled with the stem, the stem being operatively coupled with the elastic button.

10. The tap of claim 6, wherein the body is a single piece of plastic material on which the intermediate tank is also positioned and directly connected to the at least one main accumulating tank and to the container of liquid.

11. The tap of claim 1, wherein a lower part of the body is internally shaped with a slanted wall, the lower part being adapted to be coupled, for performing a liquid seal, with a lower part of the stem, the lower part being made with a self-centering bevelled geometry.

12. The tap of claim 11, wherein an external surface of the lower part of the stem is smooth and adapted to seal against a circular projection with which the lower part of the body is internally equipped.

13. The tap of claim 1, wherein the body is equipped with a part adapted to contact the container for liquid and to form a complete seal with the container, the part being equipped with at least one reference element adapted to correctly position the tap on the container through a cooperation with reference elements placed on the container.

14. The tap of claim 1, wherein the valve is molded from a semi-rigid material.

15. The tap of claim 14, wherein the valve is equipped with an upper flexible lip adapted to compensate for possible non-axial movements of the stem means and adapted to always provide a desired pull in a sealing area.

16. The tap of claim 14, wherein the valve is equipped with a flexible lower lip, adapted to compensate for and dampen possible non-axial movements, the lower lip operating as self-centering element for the stem during sliding.

17. The tap of claim 14, wherein an external area of the valve is equipped with a self-lubricating hollow space and a sealing area adapted to cooperate with the body in its cylindrical part.

18. The tap of claim 14, wherein the valve includes:
   a facilitating bevel in its engagement area with the stem for centering on the stem;
   a sealing projection on the stem; and
   a fastening projection adapted to allow coupling between the stem and the valve.

19. The tap of claim 14, wherein the valve includes a safety trap adapted to hold possible material leaks.

20. The tap of claim 14, wherein the valve and the stem are formed as a unitary body are adapted to open and close the liquid delivering passage and equipped with a weakening element that allows the valve to flex to form a seal upon closing the chamber and also to be able to flex along another direction and allow assembling the unitary body in the body.

21. The tap of claim 1, wherein the elastic button is equipped with at least one fastening projection that is adapted to engage a corresponding recess obtained in the upper part of the stem, the elastic button being further equipped with a geometry adapted to engage a corresponding sealing recess external to the cylinder of the body.

22. The tap of claim 1, wherein:
   the stem includes an elongated body that ends at one end with a holding tooth adapted and configured for coupling with the elastic button and at an opposite end with a self-centering bevelled part, and
   the elongated body includes a holding seat composed of a tooth and a recess, in addition to a liquid sealing area that cooperates with the lower part of the valve.

23. The tap of claim 1, wherein the stem is equipped with wings for centering the stem in the cylinder of the body.

24. The tap of claim 1, wherein the tap is further equipped with warranty seal means, the warranty seal means being adapted to prevent an operating actuation of the tap when the warranty seal means are present.

\* \* \* \* \*